United States Patent
Hirakawa

(10) Patent No.: US 9,738,344 B2
(45) Date of Patent: Aug. 22, 2017

(54) VEHICLE

(71) Applicant: YAMAHA HATSUDOKI KABUSHIKI KAISHA, Iwata-shi, Shizuoka (JP)

(72) Inventor: Nobuhiko Hirakawa, Shizuoka (JP)

(73) Assignee: YAMAHA HATSUDOKI KABUSHIKI KAISHA, Shizouka (JP)

( * ) Notice: Subject to any disclaimer, the term of this patent is extended or adjusted under 35 U.S.C. 154(b) by 0 days.

(21) Appl. No.: 15/279,774

(22) Filed: Sep. 29, 2016

(65) Prior Publication Data
US 2017/0088223 A1 Mar. 30, 2017

(30) Foreign Application Priority Data
Sep. 30, 2015 (JP) ................... 2015-194209

(51) Int. Cl.
| | |
|---|---|
| *B62K 5/10* | (2013.01) |
| *B62K 5/08* | (2006.01) |
| *B62K 5/05* | (2013.01) |
| *B60G 21/02* | (2006.01) |
| *B62K 5/00* | (2013.01) |

(52) U.S. Cl.
CPC ............. *B62K 5/10* (2013.01); *B60G 21/026* (2013.01); *B62K 5/05* (2013.01); *B62K 5/08* (2013.01); *B60G 2300/122* (2013.01); *B62K 2005/001* (2013.01)

(58) Field of Classification Search
CPC ............................................. B62K 2005/001
See application file for complete search history.

(56) References Cited

U.S. PATENT DOCUMENTS

| | | | | |
|---|---|---|---|---|
| 8,262,111 B2* | 9/2012 | Lucas | ...................... | B60G 3/20 180/210 |
| 8,814,186 B1* | 8/2014 | Rinda | ...................... | B62K 5/06 280/124.135 |
| 2015/0232147 A1* | 8/2015 | Hirayama | .............. | B62K 21/02 280/267 |
| 2015/0298736 A1 | 10/2015 | Sasaki et al. | | |
| 2015/0321721 A1* | 11/2015 | Sasaki | ...................... | B62K 5/05 180/210 |

(Continued)

FOREIGN PATENT DOCUMENTS

| | | |
|---|---|---|
| FR | 2 995 255 A1 | 3/2014 |
| JP | 5595624 B1 | 9/2014 |

(Continued)

*Primary Examiner* — Nicole Verley
(74) *Attorney, Agent, or Firm* — Keating and Bennett, LLP

(57) ABSTRACT

In a vehicle, a left cover attached to a left side member covers at least one of a left upper edge of an upper cross member, a left lower edge of the upper cross member, a left upper edge of a lower cross member, and a left lower edge of the lower cross member, from the left in a left-right direction of a body frame together with at least a portion of the left side member. A right cover attached to a right side member covers at least one of a right upper edge of the upper cross member, a right lower edge of the upper cross member, a right upper edge of an upper edge of the lower cross member, and a right lower edge of the lower cross member, from the right in the left-right direction of the body frame together with at least a portion of the right side member.

9 Claims, 12 Drawing Sheets

(56) References Cited

U.S. PATENT DOCUMENTS

| | | | |
|---|---|---|---|
| 2016/0107713 A1* | 4/2016 | Takano | B62K 5/027 |
| | | | 180/210 |
| 2016/0152278 A1* | 6/2016 | Kawashiri | B60Q 1/0035 |
| | | | 180/89.1 |
| 2016/0152293 A1* | 6/2016 | Hirayama | B62K 5/05 |
| | | | 280/124.103 |
| 2016/0185413 A1* | 6/2016 | Takano | B62K 21/00 |
| | | | 280/124.103 |
| 2016/0244118 A1* | 8/2016 | Tanabe | B62J 23/00 |
| 2016/0280193 A1* | 9/2016 | Seto | B60T 8/1706 |

FOREIGN PATENT DOCUMENTS

| | | | | |
|---|---|---|---|---|
| JP | 2130731 B1 * | 7/2015 | | B60T 8/3685 |
| JP | 3069979 A2 * | 9/2016 | | B60G 13/003 |

\* cited by examiner

VEHICLE

BACKGROUND OF THE INVENTION

Field of the Invention

The present invention relates to a vehicle equipped with a leanable body frame and two front wheels.

Description of the Related Art

A vehicle described in, for example, Japanese Patent No. 5595624 includes a body frame and two front wheels that are arranged side by side in a left-right direction of the body frame.

The vehicle includes a linkage. The linkage includes an upper cross member, a lower cross member, a left side member and a right side member. The upper cross member, the lower cross member, the left side member and the right side member are connected so that the upper cross member and the lower cross member maintain postures that are parallel to each other and the left side member and the right side member maintain postures that are parallel to each other.

The vehicle described in Japanese Patent No. 5595624 includes a left protector and a right protector that prevent or reduce intrusion of a flying object into an area behind the left front wheel and the right front wheel while the vehicle is running, in addition to a link cover that covers the linkage and which is not movable relative to the body frame (the left protecting cover 226L and the right protecting cover 226R shown in FIG. 13 and described in the paragraphs [0200] to [0203]). The left protector and the right protector are attached to the lower cross member and can be displaced relative to the body frame as the linkage operates.

It is possible to make the link cover smaller in size by assigning a function to prevent or reduce the intrusion of the flying object into the area behind the left front wheel and the right front wheel while the vehicle is running to the right protector and the left protector. Since the left protector and the right protector are able to be displaced relative to the body frame as the linkage operates, the left protector and the right protector do not have to cover the entire moving area of the portion that needs to be protected, and hence, the left protector and the right protector is smaller in size. As a result, it is possible to make the front portion of the vehicle smaller in size while ensuring the protecting function against flying objects while the vehicle is running.

Foreign matters that intrude into the linkage are not limited to flying objects that come flying from the front of the vehicle while the vehicle is running. It is possible that foreign matter intrudes into the linkage from a side of the vehicle during a stop.

The vehicle described in Japanese Patent No. 5595624 includes the front cover that does not change its relative position to the body frame. With the vehicle standing upright, the linkage is covered by the front cover. In order to prevent or reduce the intrusion of foreign matter into the linkage from a side of the vehicle, it is conceivable that the shape of the front cover is changed so as to cover where the intrusion may occur from the lateral sides of the vehicle.

However, as the body frame leans, the left side member or the right side member of the linkage is displaced downwards relative to the front cover. As the left side member or the right side member is displaced, the portions where the intrusion may occur also move downwards. In order to cover the portions with the front cover, a lower end of the front cover needs to be extended downwards to a large extent. In this case, it is inevitable that the front cover is enlarged (and hence, the front portion of the vehicle is enlarged) and additionally, there might be a case that the left and right front wheels and their peripheral members (the suspensions and the front fenders) interfere with the extended lower end of the front cover. Then, when attempting to ensure a space to avoid the interference, the front cover (and hence, the front portion of the vehicle) is also enlarged in the front-rear direction and the left-right direction.

Thus, there is a goal to prevent the enlargement in size of the front portion of the vehicle while enabling the prevention or reduction of intrusion of foreign matter into the linkage.

The inventor of preferred embodiments of the present invention discovered that intrusion of foreign matter into portions where arbitrary two members among the upper cross member, the lower cross member, the left side member and the right side member overlap each other in the front-rear direction of the body frame can particularly cause a problem with the operation of the linkage. The intrusion of foreign matter can occur at these portions since the pair of members change their relative posture while overlapping each other in the front-rear direction of the body frame.

More specifically, it was discovered that the intrusion of foreign matter can occur at the following portions. A left upper edge that is a portion of an upper edge of the upper cross member and which overlaps the left side member as viewed from the front in the front-rear direction of the body frame, a left lower edge that is a portion of a lower edge of the upper cross member and which overlaps the left side member as viewed from the front in the front-rear direction of the body frame, a left upper edge that is a portion of an upper edge of the lower cross member and which overlaps the left side member as viewed from the front in the front-rear direction of the body frame, a left lower edge that is a portion of a lower edge of the lower cross member and which overlaps the left side member as viewed from the front in the front-rear direction of the body frame, a right upper edge that is a portion of the upper edge of the upper cross member and which overlaps the right side member as viewed from the front in the front-rear direction of the body frame, a right lower edge that is a portion of the lower edge of the upper cross member and which overlaps the right side member as viewed from the front in the front-rear direction of the body frame, a right upper edge that is a portion of the upper edge of the lower cross member and which overlaps the right side member as viewed from the front in the front-rear direction of the body frame, and a right lower edge that is a portion of the lower edge of the lower cross member and which overlaps the right side member as viewed from the front in the front-rear direction of the body frame. In the vehicle disclosed in Japanese Patent No. 5595624, these portions are protected by a link cover that is immovably fixed relative to the body frame.

The inventor conceived that the enlargement in size of the front portion of the vehicle is prevented while enabling the prevention or reduction of intrusion of foreign matter into the linkage by attaching, to the left side member, the left cover that covers at least one of the left upper edge of the upper cross member, the left lower edge of the upper cross member, the left upper edge of the lower cross member and the left lower edge of the lower cross member from the left in the left-right direction of the body frame together with the left side member, and by attaching, to the right side member, the right cover that covers at least one of the right upper edge of the upper cross member, the right lower edge of the upper cross member, the right upper edge of the lower cross member and the right lower edge of the lower cross member from the right in the left-right direction of the body frame together with the right side member.

According to this configuration, as the linkage operates, the left cover is displaced together with the left side member relative to the body frame, and the right cover is displaced together with the right side member relative to the body frame. In other words, the relative position of the left cover to the left side member and the relative position of the right cover to the right side member do not change substantially even though the linkage operates. Consequently, the left cover and the right cover do not have to continue to cover the entire portions that need to be protected and hence could have a minimum area. In addition, since the relative positions do not change substantially even though the linkage operates, there is no need to consider the interference of the left cover with the left side member and the interference of the right cover with the right side member. Consequently, the left cover and the right cover are easily disposed closely to the portion required to be protected. As a result, it is possible to prevent the enlargement in size of the front portion of the vehicle while preventing or significantly reducing the intrusion of foreign matter into the linkage particularly from the lateral side.

In addition, in a case where a front cover that is immobile relative to the body frame is provided, since the function to prevent or significantly reduce the intrusion of foreign matter into the linkage from the lateral side is partially assigned to the left cover and the right cover, it is possible to reduce the front cover in size. Also this fact may contribute to preventing the enlargement in size of the front portion of the vehicle.

SUMMARY OF THE INVENTION

Accordingly, a preferred embodiment of the present invention includes a vehicle including a body frame; a left front wheel and a right front wheel that are arranged side by side in a left-right direction of the body frame; and a linkage disposed above the left front wheel and the right front wheel in an up-down direction of the body frame, and that changes positions of the left front wheel and the right front wheel relative to the body frame to cause the body frame to lean to left or right of the vehicle, wherein the linkage includes an upper cross member, a lower cross member, a left side member and a right side member; the upper cross member, the lower cross member, the left side member and the right side member are connected such that the upper cross member and the lower cross member maintain postures that are parallel to each other, and such that the left side member and the right side member maintain postures that are parallel to each other; the vehicle further includes a left cover attached to the left side member; and a right cover attached to the right side member; the left cover covers at least one of a left upper edge defining a portion of an upper edge of the upper cross member, and overlapping the left side member as viewed from the front in a front-rear direction of the body frame; a left lower edge defining a portion of a lower edge of the upper cross member, and overlapping the left side member as viewed from the front in the front-rear direction of the body frame; a left upper edge defining a portion of an upper edge of the lower cross member, and overlapping the left side member as viewed from the front in the front-rear direction of the body frame; and a left lower edge defining a portion of a lower edge of the lower cross member, and overlapping the left side member as viewed from the front in the front-rear direction of the body frame, from the left in the left-right direction of the body frame together with at least a portion of the left side member; and the right cover covers at least one of a right upper edge defining a portion of an upper edge of the upper cross member, and overlapping the right side member as viewed from the front in the front-rear direction of the body frame; a right lower edge defining a portion of a lower edge of the upper cross member, and overlapping the right side member as viewed from the front in the front-rear direction of the body frame; a right upper edge defining a portion of an upper edge of the lower cross member, and overlapping the right side member as viewed from the front in the front-rear direction of the body frame; and a right lower edge defining a portion of a lower edge of the lower cross member, and overlapping the right side member as viewed from the front in the front-rear direction of the body frame, from the right in the left-right direction of the body frame together with at least a portion of the right side member.

Preferably, the above vehicle may be configured as follows. The left cover covers the left upper edge of the lower cross member and the left lower edge of the lower cross member from the left in the left-right direction of the body frame. The right cover covers the right upper edge of the lower cross member and the right lower edge of the lower cross member from the right in the left-right direction of the body frame.

More preferably, the above vehicle may be configured as follows. The left cover covers the left lower edge of the upper cross member from the left in the left-right direction of the body frame. The right cover covers the right lower edge of the upper cross member from the right in the left-right direction of the body frame.

More preferably, the above vehicle may be configured as follows. The lower cross member is connected to a lower intermediate connector so as to be able to turn about a lower intermediate connecting axis. The lower cross member includes a front element disposed directly ahead of the lower intermediate connector in a direction following the lower intermediate connecting axis; and a rear element disposed directly behind the lower intermediate connector in the direction following the lower intermediate connecting axis. The left upper edge of the lower cross member includes a left upper edge defining a portion of an upper edge of the front element, and overlapping the left side member as viewed from the front in the front-rear direction of the body frame; and a left upper edge defining a portion of an upper edge of the rear element, and overlapping the left side member as viewed from the front in the front-rear direction of the body frame. The left lower edge of the lower cross member includes a left lower edge defining a portion of a lower edge of the front element, and overlapping the left side member as viewed from the front in the front-rear direction of the body frame; and a left lower edge defining a portion of a lower edge of the rear element, and overlapping the left side member as viewed from the front in the front-rear direction of the body frame. The right upper edge of the lower cross member includes a right upper edge defining a portion of the upper edge of the front element, and overlapping the right side member as viewed from the front in the front-rear direction of the body frame; and a right upper edge defining a portion of the upper edge of the rear element, and overlapping the right side member as viewed from the front in the front-rear direction of the body frame. The right lower edge of the lower cross member includes a right lower edge defining a portion of the lower edge of the front element, and overlapping the right side member as viewed from the front in the front-rear direction of the body frame; and a right lower edge defining a portion of the lower edge of the rear element, and overlapping the right side member as viewed from the front in the front-rear direction of the body frame.

The above vehicle may include a left suspension supporting the left front wheel and supported on the left side member; and a right suspension supporting the right front wheel and supported on the right side member. The above vehicle may be configured as follows. The left cover at least partially covers the left suspension from the left in the left-right direction of the body frame; and the right cover at least partially covers the right suspension from the right in the left-right direction of the body frame.

Foreign matter might intrude into a space between the lower cross member and the left suspension whose relative posture changes as the linkage operates as well as a space between the lower cross member and the right suspension whose relative posture changes as the linkage operates. According to the configuration described above, the left side member and the right cover also protect the portions concerned. Consequently, it is possible to prevent the enlargement in size of the front portion of the vehicle while preventing or further reducing the intrusion of foreign matter into the linkage.

The above vehicle may be configured as follows. The left cover covers at least one of the left upper edge of the upper cross member; the left lower edge of the upper cross member; the left upper edge of the lower cross member; and the left lower edge of the lower cross member, from the front in the front-rear direction of the body frame. The right cover covers at least one of the right upper edge of the upper cross member; the right lower edge of the upper cross member; the right upper edge of the lower cross member; and the right lower edge of the lower cross member, from the front in the front-rear direction of the body frame.

According to this configuration, the intrusion of foreign matter into the linkage is prevented or reduced not only from the lateral sides but also from the front of the linkage. Consequently, it is possible to prevent the enlargement in size of the front portion of the vehicle while preventing or further reducing the intrusion of foreign matter into the linkage.

In this case, the above vehicle may include an exterior portion supported at a position between the left side member and the right side member as viewed from the front in the front-rear direction of the body frame. Here, the vehicle may be configured such that the left cover and the right cover overlap the exterior portion as viewed from the front in the front-rear direction when the vehicle is in a upright state.

A headlamp may be exemplified as the exterior portion. With the above configuration, the intrusion of foreign matter into the linkage from the front is prevented or reduced in cooperation with such exterior portion that is inherently equipped on the vehicle. When the vehicle leans to the left or right, a right end of the left cover and a left end of the right cover approach each other. In order to avoid interference therebetween, a distance between the left cover and the right cover in the left-right direction of the body frame needs to be ensured to a certain extent. Also in this case, the function to prevent or reduce the intrusion of foreign matter is assigned to the exterior portion that is disposed between the right end of the left cover and the left end of the right cover. Accordingly, the area of the left cover and the right cover is small. Consequently, it is possible to prevent further the enlargement in size of the front portion of the vehicle while preventing or further reducing the intrusion of foreign matter into the linkage.

The above vehicle may include a plurality of left attachments spaced apart from each other in a direction in which the left side member extends; and a plurality of right attachments spaced apart from each other in a direction in which the right side member extends. Here, the above vehicle may be configured as follows. The left cover is attached to the left side member via the left attachments. The right cover is attached to the right side member via the right attachments.

According to this configuration, the supporting rigidity of the left cover and the right cover is improved, thus enhancing the stability in following the displacement of the left side member and the right side member that occurs as the linkage operates. Consequently, it is possible to prevent the enlargement in size of the front portion of the vehicle while preventing or further reducing the intrusion of foreign matter into the linkage.

The above vehicle may be configured as follows. The left side member includes an upper left connector to which a left portion of the upper cross member is turnably connected; and a lower left connector to which a left portion of the lower cross member is turnably connected. The left cover is attached to the left side member via at least one of the upper left connector and the lower left connector. The right side member includes an upper right connector to which a right portion of the upper cross member is turnably connected; and a lower right connector to which a right portion of the lower cross member is turnably connected. The right cover is attached to the right side member via at least one of the upper right connector and the lower right connector.

According to this configuration, the left cover and the right cover are attached by making use of the upper left connector, the lower left connector, the upper right connector and the lower right connector that are inherently equipped on the linkage. Thus, independent attachments do not have to be provided on the left side member and the right side member, thus making it possible to prevent the enlargement in size of the left side member and the right side member. Consequently, it is possible to prevent further the enlargement in size of the front portion of the vehicle while preventing or significantly reducing the intrusion of foreign matter into the linkage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
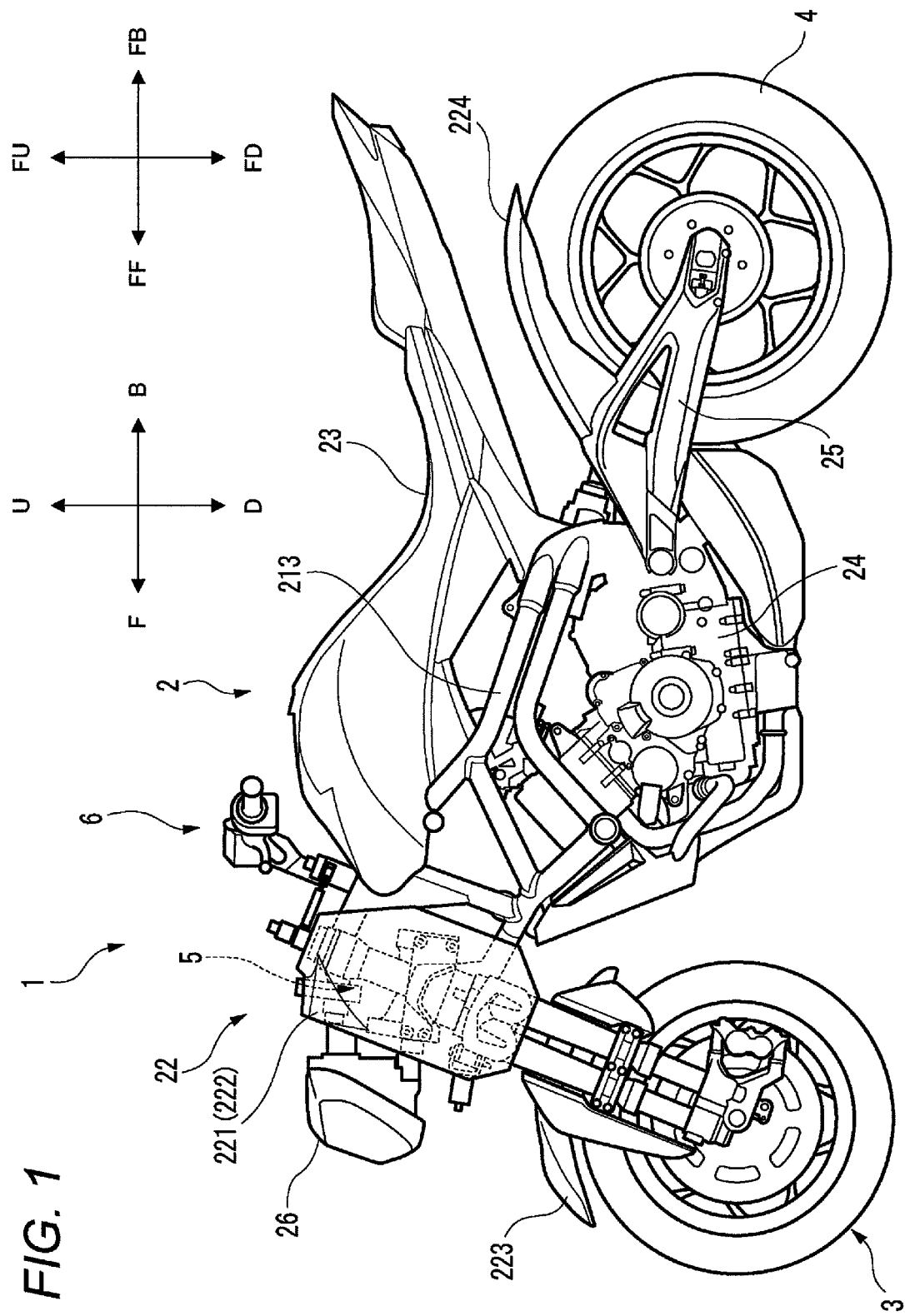
FIG. 1 is a left side view showing an entire vehicle according to a preferred embodiment of the present invention.

Referring to the accompanying drawings, preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame being caused to lean to the left or right of the vehicle from a vertical direction. In addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame" and an "up-down direction of the body frame" mean a front-rear direction, a left-right direction and an up-down direction based on the body frame when viewed from a rider who rides the vehicle. "A side of or sideways of the body frame" means directly on the right or left in the left-right direction of the body frame.

In this description, an expression "extending in the front-rear direction of the vehicle body frame" includes a fact that it extends while being inclined in relation to the front-rear direction of the vehicle body frame and means that it extends in a direction closer to the front-rear direction of the vehicle body frame than the left-right direction and up-down direction of the vehicle body frame.

In this description, an expression "extending in the left-right direction of the vehicle body frame" includes a fact that it extends while being inclined in relation to the left-right direction of the vehicle body frame and means that it extends in a direction closer to the left-right direction of the vehicle body frame than the front-rear direction and up-down direction of the vehicle body frame.

In this description, an expression "extending in the up-down direction of the vehicle body frame" includes a fact that it extends while being inclined in relation to the up-down direction of the vehicle body frame and means that it extends in a direction closer to the up-down direction of the vehicle body frame than the left-right direction and front-rear direction of the vehicle body frame.

In this description, an expression reading the "vehicle is standing upright or in an upright state" or the "body frame is standing upright or in the upright state" means a state in which the vehicle is not steered at all and the up-down direction of the body frame coincides with the vertical direction. In this state, the directions based on the vehicle coincide with the directions based on the body frame. When the vehicle is turning with the body frame caused to lean to the left or right from the vertical direction, the left-right direction of the vehicle does not coincide with the left-right direction of the body frame. Similarly, the up-down direction of the vehicle does not coincide with the up-down direction of the body frame. However, the front-rear direction of the vehicle coincides with the front-rear direction of the body frame.

In this description, an expression reading "directly on the left of a member A in the left-right direction of the body frame" denotes a space through which the member A passes when the member A is translated to the left in the left-right direction of the body frame. An expression reading "directly on the right of the member A" is also defined in the same way.

In this description, an expression reading "on the left of the member A in the left-right direction of the body frame" includes not only the space through which the member A passes when the member A is translated to the left in the left-right direction of the body frame but also a space which expands from the space in directions which are at right angles to the left-right direction of the body frame. An expression reading "on the right of the member A" is also defined in the same way.

In this description, an expression reading "directly above the member A in the up-down direction of the body frame" denotes a space through which the member A passes when the member A is translated upwards in the up-down direction of the body frame. An expression reading "directly below the member A" is also defined in the same way.

In this description, an expression reading "above the member A in the up-down direction of the body frame" includes not only the space through which the member A passes when the member A is translated upwards in the up-down direction of the body frame but also a space which expands from the space in directions which are at right angles to the up-down direction of the body frame. An expression reading "below the member A" is also defined in the same way.

In this description, an expression reading "directly ahead of the member A in the front-rear direction of the body frame" denotes a space through which the member A passes when the member A is translated to the front in the front-rear direction of the body frame. An expression reading "directly behind the member A" is also defined in the same way.

In this description, an expression reading "ahead of the member A in the front-rear direction of the body frame" includes not only the space through which the member A passes when the member A is translated to the front in the front-rear direction of the body frame but also a space which expands from the space in directions which are at right angles to the front-rear direction of the body frame. An expression reading "behind the member A" is also defined in the same way.

In this description, "rotation, rotating or rotated" means that a member is displaced at an angle of 360 degrees or more about an axis thereof. In this description, "turn, turning or turned" means that a member is displaced at an angle less than 360 degrees about an axis thereof.

In this description, an expression reading a member "is attached" includes a case where the member is attached directly to another member and a case where the member is attached indirectly to another member via a different member.

Referring to FIGS. 1 to 11, a vehicle 1 according to preferred embodiments of the present invention will be described. As shown in FIG. 1, the vehicle 1 includes a vehicle main body 2, two front wheels 3, a rear wheel 4, a linkage 5 and a steering member 6. The vehicle 1 includes a leanable body frame and the two front wheels 3 arranged side by side in the left-right direction of the body frame.

The vehicle main body 2 includes a body frame 21, a body cover 22, a seat 23, an engine unit 24, a rear arm 25 and a headlamp unit 26.

In FIG. 1, the body frame 21 is in the upright state. The following description to be made while referring to FIG. 1 is based on the premise that the body frame 21 is in the upright state. FIG. 1 is a left side view resulting when the entire vehicle 1 is viewed from the left in the left-right direction of the body frame 21.

Figure 2:
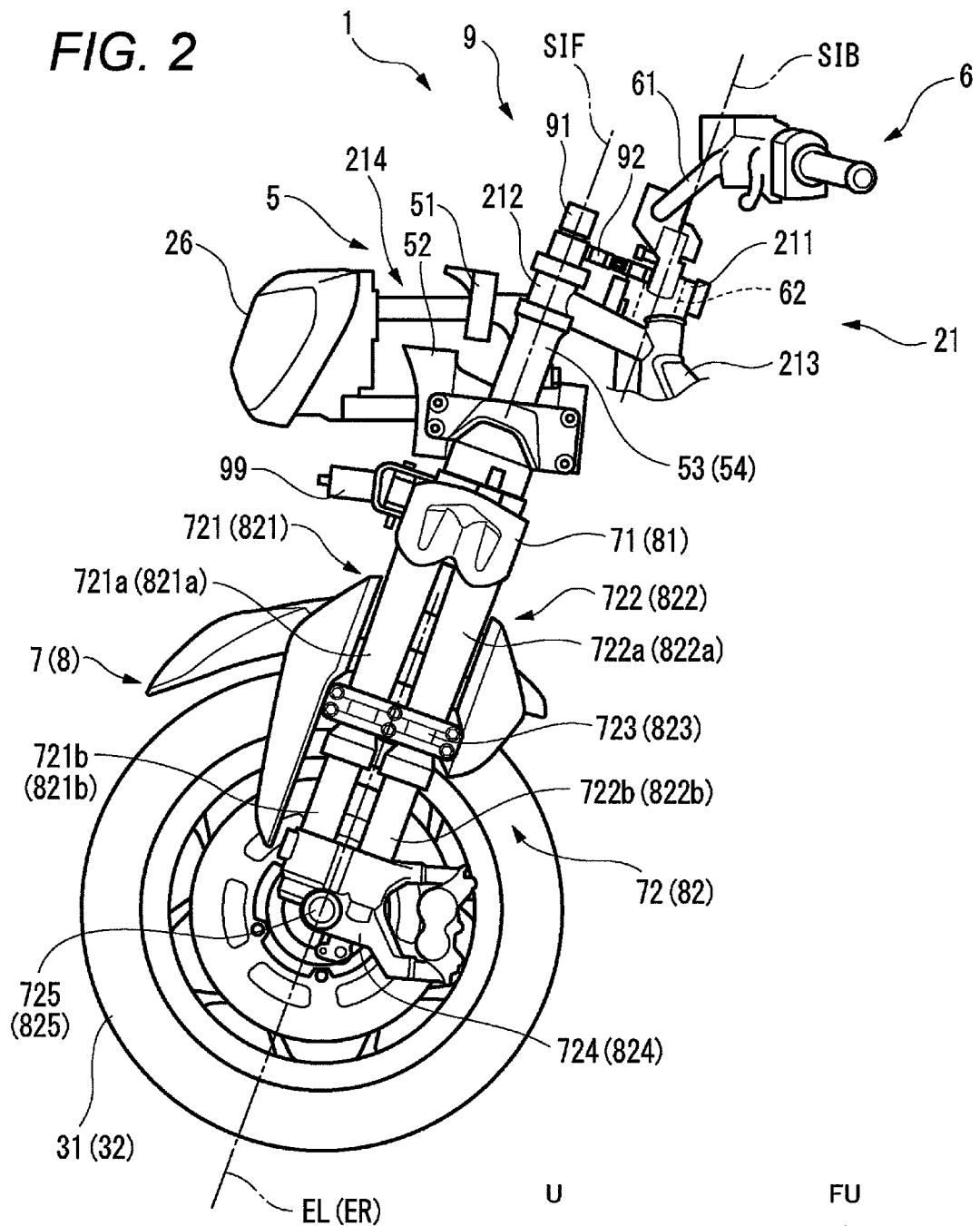
FIG. 2 is a left side view showing a front portion of the vehicle of FIG. 1 in an enlarged manner.
Figure 2:
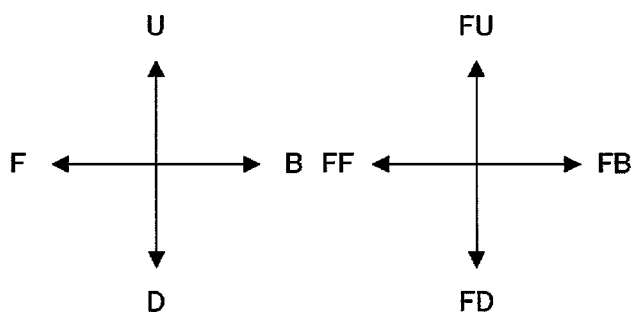

FIG. 2 is a view when a front portion of the vehicle 1 is viewed from the left in the left-right direction of the body frame 21. In FIG. 2, the body frame 21 is in the upright state. The following description to be made while referring to FIG. 2 is based on the premise that the body frame 21 is in the upright state.

The body frame 21 includes a head pipe 211, a link support 212, a main frame 213 and a headlamp support 214. The head pipe 211 supports the steering member 6. The link support 212 supports the linkage 5. The main frame 213 supports the seat 23, the engine unit 24 and the rear arm 25. The headlamp support 214 supports the headlamp unit 26.

The rear arm 25 is disposed directly behind the main frame 213 in the front-rear direction of the body frame 21. The rear arm 25 extends in the front-rear direction of the body frame 21. A front end of the rear arm 25 is supported by the main frame 213 and the engine unit 24 and is able to turn about an axis that extends in the left-to-rear direction of the body frame 21. A rear end of the rear arm 25 supports the rear wheel 4.

The body cover 22 is a body portion that covers at least a portion of a group of constituent elements that define the vehicle 1. The body cover 22 includes a left side cover 221, a right side cover 222, a pair of left and right front fenders 223 and a rear fender 224. In FIG. 2, the left side cover 221 and the right side cover 222 are omitted from illustration.

The left side cover 221 is disposed ahead of the seat 23 in the front-rear direction of the body frame 21. The left side cover 221 covers the linkage 5, the steering member 6 and at least a portion of a steering force transmission 9.

The right side cover 222 is disposed ahead of the seat 23 in the front-rear direction of the body frame 21. The right side cover 222 covers the linkage 5, the steering member 6 and at least a portion of the steering force transmission 9. The right side cover 222 is invisible from a viewpoint of FIG. 1. The position where the right side cover 222 is disposed when viewed from the right of the vehicle 1 is symmetrical with the position where the left side cover 221 is disposed when viewed from the left of the vehicle 1 in relation to the front-rear direction. Thus, individual illustration of the right side cover 222 is omitted, and only reference numerals related thereto will be shown in the figure.

At least portions of the pair of left and right front fenders 223 are disposed below the left side cover 221 and the right side cover 222, respectively. At least portions of the pair of left and right front fenders 223 are disposed directly above the pair of left and right front wheels 3, respectively.

At least a portion of the rear wheel 4 is disposed below the seat 23 in the up-down direction of the body frame 21. At least a portion of the rear wheel 4 is disposed directly below the rear fender 224 in the up-down direction of the body frame 21.

The vehicle 1 according to a preferred embodiment is a vehicle on which a rider mounts in a posture of straddling the body frame 21. Namely, when riding the vehicle 1, a portion of the body frame 21, which is disposed ahead of the seat 23 on which the rider sits in the front-rear direction of the body frame 21, is disposed between the legs of the rider. The rider rides on the vehicle 1 in a posture of holding the main frame 213 that is positioned ahead of the seat 23 in the front-rear direction of the body frame 21 by the legs therebetween.

When viewing the vehicle 1 from the left-right direction of the body frame 21, the engine unit 24 is disposed ahead of a front end of the rear wheel 4 in the front-rear direction of the body frame 21. The engine unit 24 is disposed so as not to be movable relative to the body frame 21. The engine unit 24 is disposed so as not to be movable relative to the main frame 213. The engine 24 produces power to drive the vehicle 1. The driving force produced is transmitted to the rear wheel 4.

The head pipe 211 is disposed at a front portion of the vehicle 1. When viewing the vehicle 1 from the left in the left-right direction of the body frame 21, an upper portion of the head pipe 211 is disposed behind a lower portion of the head pipe 211 in the front-rear direction of the body frame 21.

The steering member 6 includes a handlebar 61 and an upstream steering shaft 62. The upstream steering shaft 62 extends downwards from a central portion of the handlebar 61 in the left-right direction. The upstream steering shaft 62 is supported on the head pipe 211 so as to turn about a rear intermediate steering axis SIB.

The link support 212 is disposed directly ahead of the head pipe 211 in the front-rear direction of the body frame 21. When viewing the vehicle 1 from the left in the left-right direction of the body frame 21, an upper portion of the link support 212 is disposed behind a lower portion of the link support 212 in the front-rear direction of the body frame 21.

Figure 3:
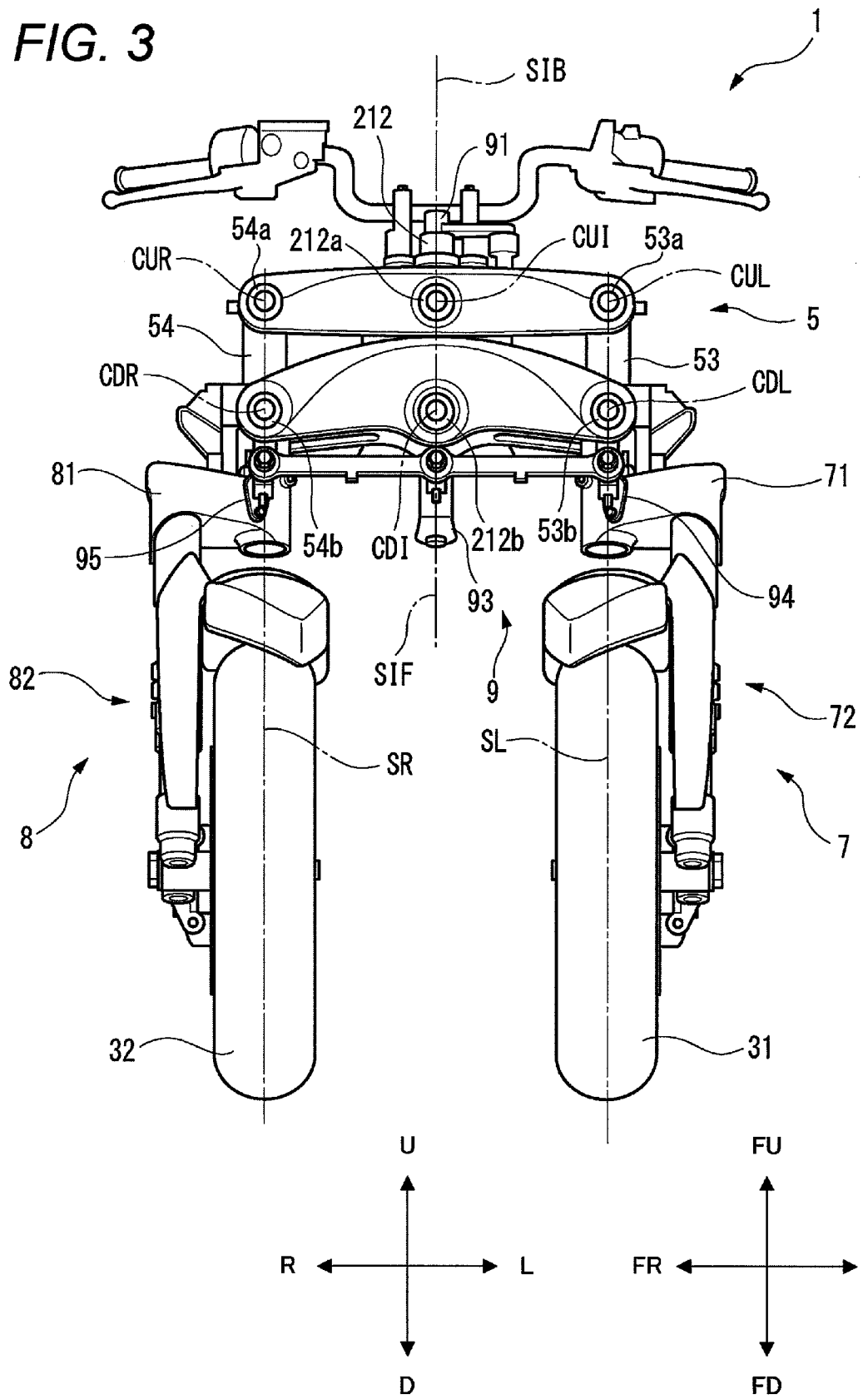
FIG. 3 is a front view showing the front portion of the vehicle of FIG. 1.

FIG. 3 is a front view of the front portion of the vehicle 1 when viewed from the front in the front-rear direction of the body frame 21. In FIG. 3, the body frame 21 is in the upright state. The following description to be made while referring to FIG. 3 is based on the premise that the body frame 21 is in the upright state. In FIG. 3, the headlamp unit 26, the headlamp support 214, the left side cover 221 and the right side cover 222 are omitted from illustration.

The two front wheels 3 include a left front wheel 31 and a right front wheel 32. The left front wheel 31 is disposed on the left of the head pipe 211 and the link support 212 which define a portion of the body frame 21 in the left-right direction of the body frame 21. The right front wheel 32 is disposed on the right of the head pipe 211 and the link support 212 which define a portion of the body frame 21 in the left-right direction of the body frame 21. The left front wheel 31 and the right front wheel 32 are arranged side by side in the left-right direction of the body frame 21.

In the vehicle 1 according to the present preferred embodiment, the linkage 5 preferably uses a four parallel joint link system (also referred to as a parallelogram link).

The linkage 5 is disposed above the left front wheel 31 and the right front wheel 32 in the up-down direction of the body frame 21. The linkage 5 includes an upper cross member 51, a lower cross member 52, a left side member 53 and a right side member 54. The linkage 5 is not interlocked with the turning of the upstream steering shaft 62 about the rear intermediate steering axis SIB which occurs in association with the operation of the handlebar 61. Namely, the linkage 5 does not turn about the rear intermediate steering axis SIB relative to the body frame 21.

The link support 212 includes an upper intermediate connector 212a. An intermediate portion of the upper cross member 51 is supported on the link support 212 via the upper intermediate connector 212a. The upper cross member 51 is able to turn relative to the link support 212 about an upper intermediate connecting axis CUI that passes the upper intermediate connector 212a and extends in the front-rear direction of the body frame 21.

The upper intermediate connector 212a extends as far as the front of the upper cross member 51 and supports an upper portion of a headlamp unit 26 as a portion of a headlamp support portion 214.

The link support 212 includes a lower intermediate connector 212b. An intermediate portion of the lower cross member 52 is supported on the link support 212 via the lower intermediate connector 212b. The lower cross member 52 is able to turn relative to the link support 212 about a lower intermediate connecting axis CDI that passes the lower intermediate connector 212b and extends in the front-rear direction of the body frame 21.

The lower intermediate connector 212b extends as far as the front of the lower cross member 52 and supports a lower portion of the headlamp unit 26 as a portion of the headlamp support portion 214.

The left side member 53 includes an upper left connector 53a. A left end of the upper cross member 51 is connected to the left side member 53 via the upper left connector 53a. The upper cross member 51 is able to turn relative to the left side member 53 about an upper left connecting axis CUL that passes the upper left connecting 53a and which extends in the front-rear direction of the body frame 21.

The right side member 54 includes an upper right connector 54a. A right end of the upper cross member 51 is connected to the right side member 54 via the upper right connector 54a. The upper cross member 51 is able to turn relative to the right side member 54 about an upper right connecting axis CUR that passes the upper right connector 54a and which extends in the front-rear direction of the body frame 21.

The left side member 53 includes a lower left connector 53b. A left end of the lower cross member 52 is connected to the left side member 53 via the lower left connector 53b. The lower cross member 52 is able to turn relative to the left side member 53 about a lower left connecting axis CDL that passes the lower left connecting 53b and which extends in the front-rear direction of the body frame 21.

The right side member 54 includes a lower right connector 54b. A right end of the lower cross member 52 is connected to the right side member 54 via the lower right connector 54b. The lower cross member 52 is able to turn relative to the right side member 54 about a lower right connecting axis CDR that passes the lower right connector 54b and which extends in the front-rear direction of the body frame 21.

Figure 4:
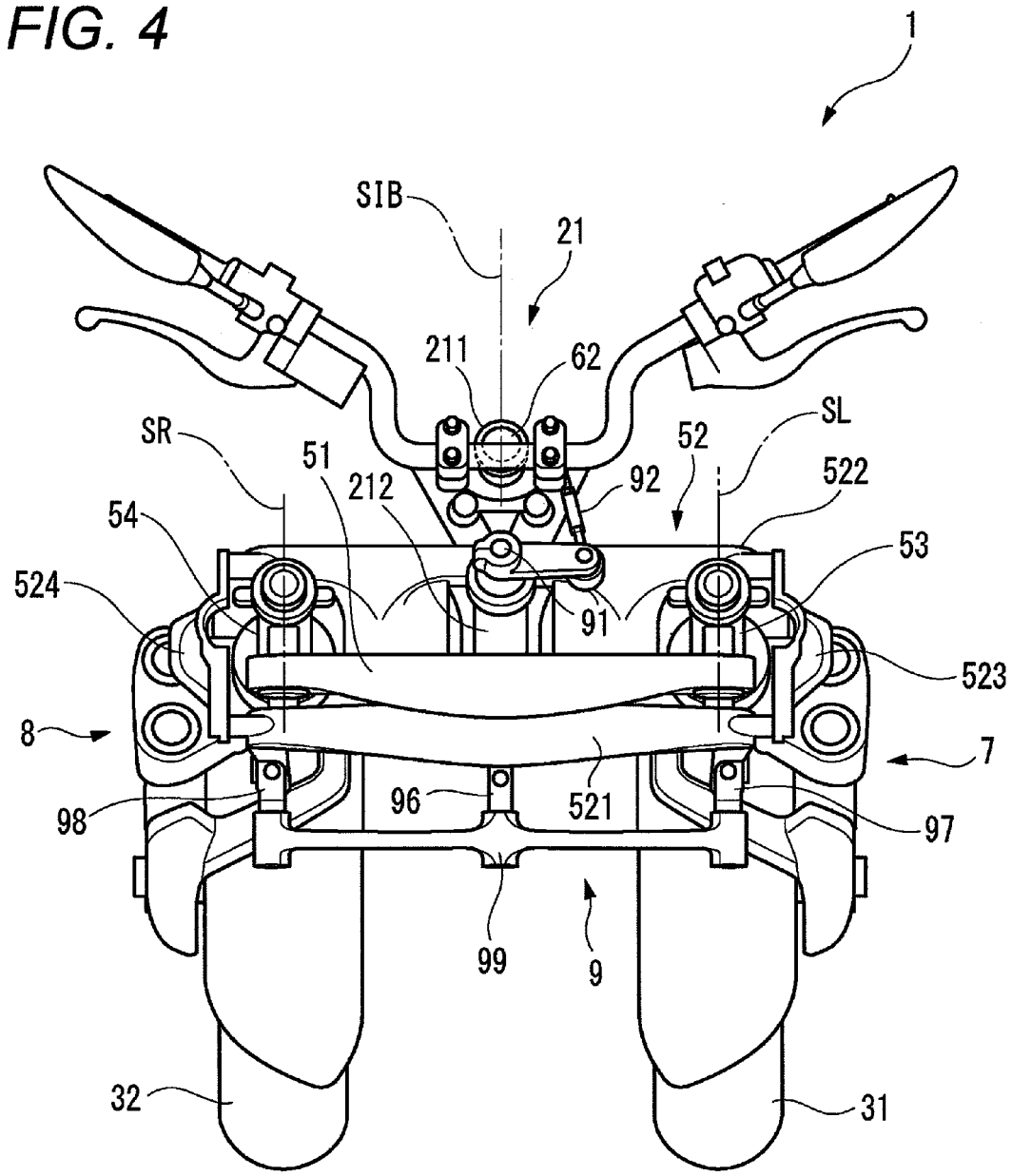
FIG. 4 is a plan view showing the front portion of the vehicle of FIG. 1.
Figure 4:
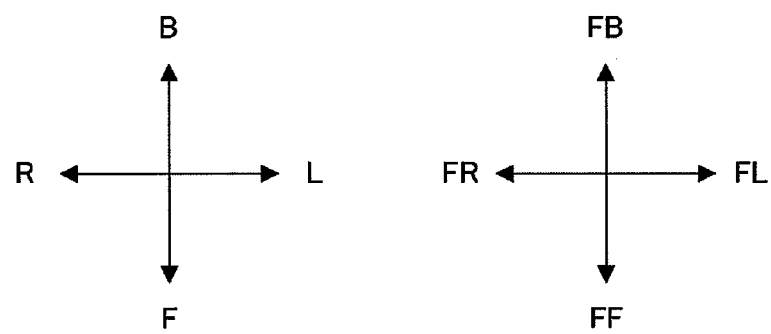

FIG. 4 is a plan view of the front portion of the vehicle 1 when viewed from above in the up-down direction of the body frame 21. In FIG. 4, the body frame 21 is in the upright state. The following description to be made while referring to FIG. 4 is based on the premise that the body frame 21 is in the upright state. In FIG. 4, the headlamp unit 26, the headlamp support 214, the left side cover 221 and the right side cover 222 are omitted from illustration.

The upper cross member 51 is disposed ahead of the link support 212 in the front-rear direction of the body frame 21. The upper cross member 51 is a plate member that extends in the left-right direction of the body frame 21 without being curved in the front-rear direction of the body frame 21.

As shown in FIGS. 2 and 4, the lower cross member 52 is disposed below the upper cross member 51 in the up-down direction of the body frame 21. The lower cross member 52 includes a front element 521 and a rear element 522. The front element 521 is disposed ahead of the link support 212, the left side member 53 and the right side member 54 in the front-rear direction of the body frame 21. The rear element 522 is disposed behind the link support 212, the left side member 53 and the right side member 54 in the front-rear direction of the body frame 21. The front element 521 and the rear element 522 extend in the left-right direction of the body frame 21 without being curved in the front-rear direction of the body frame 21.

As shown in FIG. 4, the lower cross member 52 includes a left connector 523 and a right connector 524. The left connector 523 connects a left end of the front element 521 and a left end of the rear element 522 together. The right connector 524 connects a right end of the front element 521 and a right end of the rear element 522.

As shown in FIGS. 3 and 4, the left side member 53 is disposed directly on the left of the link support 212 in the left-right direction of the body frame 21. The left side member 53 is disposed above the left front wheel 31 in the up-down direction of the body frame 21. The left side member 53 extends in a direction in which the link support 212 extends. An upper portion of the left side member 53 is disposed behind a lower portion thereof in the front-rear direction of the body frame 21.

As shown in FIGS. 3 and 4, the right side member 54 is disposed directly on the right of the link support 212 in the left-right direction of the body frame 21. The right side member 54 is disposed above the right front wheel 32 in the up-down direction of the body frame 21. The right side member 54 extends in the direction in which the link support 212 extends. An upper portion of the right side member 54 is disposed behind a lower portion thereof in the front-rear direction of the body frame 21.

The upper cross member 51, the lower cross member 52, the left side member 53 and the right side member 54 are supported on the link support 212 so that the upper cross member 51 and the lower cross member 52 maintain postures that are parallel to each other and the left side member 53 and the right side member 54 maintain postures that are parallel to each other.

As shown in FIGS. 2 to 4, the vehicle 1 includes a left suspension 7. The left suspension 7 includes a left bracket 71 and a left shock absorber 72.

The left bracket 71 includes a left turning member, not shown, that is provided at an upper portion thereof. The left turning member is disposed in an interior of the left side member 53 and extends in the same orientation as the direction in which the left side member 53 extends. The left turning member is able to turn about a left steering axis SL relative to the left side member 53. Namely, the left bracket 71 is connected to the left side member 53 so as to turn about the left steering axis SL. The left steering axis SL extends in the direction in which the left side member 53 extends. As shown in FIG. 3, the left steering axis SL extends parallel to the rear intermediate steering axis SIB of the upstream steering shaft 62 in the up-down direction of the body frame 21. As shown in FIG. 4, the left steering axis SL extends parallel to the rear intermediate steering axis SIB of the upstream steering shaft 62 in the up-down direction of the body frame 21.

The left shock absorber 72 is preferably a so-called telescopic shock absorber. The left shock absorber 72 attenuates or absorbs a displacement of the left front wheel 31 towards the linkage 5 in the up-down direction of the body frame 21. As shown in FIG. 2, the left shock absorber 72 includes a left front telescopic element 721, a left rear telescopic element 722, a left upper connector 723, a left lower connector 714 and a left axle 725.

The left front telescopic element 721 includes a left front outer tube 721a and a left front inner tube 721b. An outer diameter of the left front outer tube 721a is greater than an outer diameter of the left front inner tube 721b. The left front outer tube 721a is supported by the left bracket 71. The left front inner tube 721b is connected to the left front outer tube 721a so as to slide along a left telescopic axis EL.

The left rear telescopic element 722 includes a left rear outer tube 722a and a left rear inner tube 722b. An outer diameter of the left rear outer tube 722a is greater than an outer diameter of the left rear inner tube 722b. The left rear outer tube 722a is disposed directly behind the left front outer tube 721a in the front-rear direction of the body frame 21. The left rear outer tube 722a is supported by the left bracket 71. The left rear inner tube 722b is disposed directly behind the left front inner tube 721b in the front-rear direction of the body frame 21. The left rear inner tube 722b is connected to the left rear outer tube 722a so as to be slidable within the left rear inner tube 722b along the left telescopic axis EL.

The left upper connector 723 connects the left front outer tube 721a and the left rear outer tube 722a together.

The left lower connector 724 connects the left front inner tube 721b and the left rear inner tube 722b together.

One end (a left end) of the left axle 725 is supported on the left front inner tube 721b and the left rear inner tube 722b via the left lower connector 724. The other end (a right end) of the left axle 725 supports the left front wheel 31.

The left shock absorber 72 attenuates or absorbs a displacement of the left front wheel 31 towards the linkage 5 in the up-down direction of the body frame 21. In particular, the left rear telescopic element 722 is provided with a well-known shock absorbing mechanism (not shown) to define a left shock absorber. The left front telescopic element 721, the left upper connector 723 and the left lower connector 724 define a left turn restrictor and restrict the relative turning between the left rear outer tube 722a and the left rear inner tube 722b.

As shown in FIGS. 2 to 4, the vehicle 1 includes a right suspension 8. The right suspension 8 includes a right bracket 81 and a right shock absorber 82. The configuration of the right shock absorber 8 is symmetrical with the left suspension 7 relative to the front-rear direction of the body frame 21. Thus, the right suspension 8 is not illustrated separately, and only reference numerals for the right suspension 8 will be shown in FIG. 2.

The right bracket 81 includes a right turning member, not shown, at an upper portion thereof. The right turning member is disposed in an interior of the right side member 54 and extends in the same orientation as the direction in which the right side member 54 extends. The right turning member is able to turn about a right steering axis SR relative to the right side member 54. Namely, the right bracket 81 is connected to the right side member 54 so as to turn about the right steering axis SR. The right steering axis SR extends in the direction in which the right side member 54 extends. As shown in FIG. 3, the right steering axis SR extends parallel to the rear intermediate steering axis SIB of the upstream steering shaft 62 in the up-down direction of the body frame 21. As shown in FIG. 4, the right steering axis SR extends parallel to the rear intermediate steering axis SIB of the upstream steering shaft 62 in the up-down direction of the body frame 21.

The right shock absorber 82 is preferably a so-called telescopic shock absorber. As shown in FIG. 2, the right shock absorber 82 includes a right front telescopic element 821, a right rear telescopic element 822, a right upper connector 823, a right lower connector 824 and a right axle 825.

The right front telescopic element 821 includes a right front outer tube 821a and a right front inner tube 821b. An outer diameter of the right front outer tube 821a is greater than an outer diameter of the right front inner tube 821b. The right front outer tube 821a is supported by the right bracket 81. The right front inner tube 821b is connected to the right front outer tube 821a so as to be slidable within the right front outer tube 821a along a right telescopic axis ER.

The right rear telescopic element 822 includes a right rear outer tube 822a and a right rear inner tube 822b. An outer diameter of the right rear outer tube 822a is greater than an outer diameter of the right rear inner tube 822b. The right rear outer tube 822a is disposed directly behind the right front outer tube 821a in the front-rear direction of the body frame 21. The right rear outer tube 822a is supported by the right bracket 81. The right rear inner tube 822b is disposed directly behind the right front inner tube 821b in the front-rear direction of the body frame 21. The right rear inner tube 822b is connected to the right rear outer tube 822a so as to slide along the right telescopic axis ER.

The right upper connector 823 connects the right front outer tube 821a and the right rear outer tube 822a together.

The right lower connector 824 connects the right front inner tube 821b and the right rear inner tube 822b together.

One end (a right end) of the right axle 825 is supported on the right front inner tube 821b and the right rear inner tube 822b via the right lower connector 824. The other end (a left end) of the right axle 825 supports the right front wheel 32.

The right shock absorber 82 attenuates or absorbs a displacement of the right front wheel 32 towards the linkage 5 in the up-down direction of the body frame 21. In particular, the right rear telescopic element 822 is provided with a well-known shock absorbing mechanism (not shown) to define a right shock absorber. The right front telescopic element 821, the right upper connector 823 and the right lower connector 824 define a right turn restrictor and restrict the relative turning between the right rear outer tube 822a and the right rear inner tube 822b.

As shown in FIGS. 2 to 4, the vehicle 1 includes a steering force transmission 9. The steering force transmission 9 includes a downstream steering shaft 91, a connecting device 92, an intermediate transmission plate 93, a left transmission plate 94, a right transmission plate 95, an intermediate joint 96, a left joint 97, a right joint 98 and a tie-rod 99.

The downstream steering shaft 91 is supported on the link support 212 so as to turn about a front intermediate steering axis SIF. The front intermediate steering axis SIF extends parallel to the rear intermediate steering axis SIB about which the upstream steering shaft 62 turns.

The connecting device 92 connects the upstream steering shaft 62 and the downstream steering shaft 91 together. The connecting device 92 is displaced in association with the turning of the upstream steering shaft 62. The downstream steering shaft 91 turns in association with the displacement of the connecting device 92. Namely, the connecting device 92 transmits a turning operation of the upstream steering shaft 62 to the downstream steering shaft 91.

The intermediate transmission plate 93 is connected to a lower portion of the downstream steering shaft 91. The intermediate transmission plate 93 is not able to turn relative to the downstream steering shaft 91. The intermediate transmission plate 93 is able to turn about the front intermediate steering axis SIF relative to the link support 212.

The left transmission plate 94 is disposed directly on the left of the intermediate transmission plate 93 in the left-right direction of the body frame 21. The left transmission plate 94 is connected to a lower portion of the left bracket 71. The left transmission plate 94 is not able to turn relative to the left bracket 71. The left transmission plate 94 is able to turn about the left steering axis SL relative to the left side member 53.

The right transmission plate 95 is disposed directly on the right of the intermediate transmission plate 93 in the left-right direction of the body frame 21. The right transmission plate 95 is connected to a lower portion of the right bracket 81. The right transmission plate 95 is not able to turn relative to the right bracket 81. The right transmission plate 95 is able to turn about the right steering axis SR relative to the right side member 54.

As shown in FIG. 4, the intermediate joint 96 is connected to a front portion of the intermediate transmission plate 93 via a shaft that extends in the up-down direction of the body frame 21. The intermediate transmission plate 93 and the intermediate joint 96 are able to turn relative to each other about this shaft.

The left joint 97 is disposed on the left of the intermediate joint 96 in the left-right direction of the body frame 21. The left joint 97 is connected to a front portion of the left transmission plate 94 via a shaft that extends in the up-down direction of the body frame 21. The left transmission plate 94 and the left joint 97 are allowed to turn relative to each other about this shaft.

The right joint 98 is disposed on the right of the intermediate joint 96 in the left-right direction of the body frame 21. The right joint 98 is connected to a front portion of the right transmission plate 95 via a shaft that extends in the up-down direction of the body frame. The right transmission plate 95 and the right joint 98 are allowed to turn relative to each other about this shaft.

A shaft that extends in the front-rear direction of the body frame 21 is provided at a front portion of the intermediate joint 96. A shaft that extends in the front-rear direction of the body frame 21 is provided at a front portion of the left joint 97. A shaft that extends in the front-rear direction of the body frame 21 is provided at a front portion of the right joint 98.

The tie-rod 99 extends in the left-right direction of the body frame 21. The tie-rod 99 is connected to the intermediate joint 96, the left joint 97 and the right joint 98 via those shafts. The tie-rod 99 and the intermediate joint 96 are able to turn relative to each other about the shaft that is provided at the front portion of the intermediate joint 96. The tie-rod 99 and the left joint 97 are able to turn relative to each other about the shaft that is provided at the front portion of the left joint 97. The tie-rod 99 and the right joint 98 are able to turn relative to each other about the shaft that is provided at the front portion of the right joint 98.

The left transmission plate 94 is connected to the intermediate transmission plate 93 via the left joint 97, the tie-rod 99, and the intermediate joint 96. The right transmission plate 95 is connected to the intermediate transmission plate 93 via the right joint 98, the tie-rod 99 and the intermediate joint 96. The left transmission plate 94 and the right transmission plate 95 are connected to each other via the left joint 97, the tie-rod 99 and the right joint 98. In other words, the tie-rod 99 connects the intermediate transmission plate 93 to the left transmission plate 94 and the right transmission plate 95.

Figure 5:
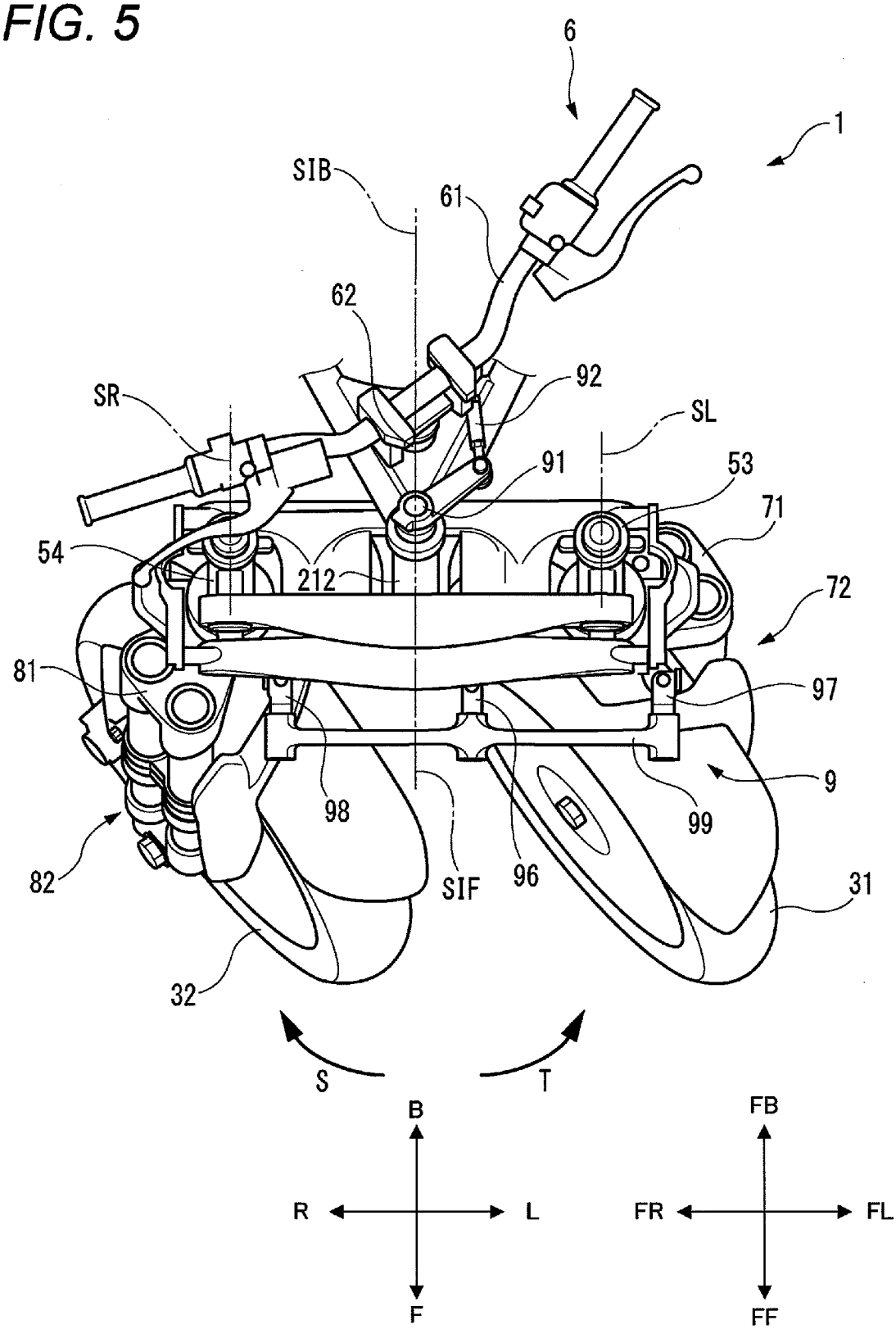
FIG. 5 is a plan view showing the front portion of the vehicle of FIG. 1 when steering is performed.

Next, referring to FIGS. 4 and 5, a steering operation of the vehicle 1 will be described. FIG. 5 is a plan view of the front portion of the vehicle 1 that is in such a state that the left front wheel 31 and the right front wheel 32 are turned to the left, as viewed from the above in the up-down direction of the body frame 21. In FIG. 5, the headlamp unit 26, the headlamp support 214, the left side cover 221 and the right side cover 222 are omitted from illustration.

When the rider operates the handlebar 61, the upstream steering shaft 62 is turned about the rear intermediate steering axis SIB relative to the head pipe 211. The turning operation of the upstream steering shaft 62 is transmitted to the downstream steering shaft 91 via the connecting device 92. When the turning of the upstream steering shaft 62 is transmitted to the downstream steering shaft 91, the downstream steering shaft 91 is turned relative to the link support 212 about the front intermediate steering axis SIF. In the case of the downstream steering shaft 91 being turned to the left as shown in FIG. 5, the steering shaft 91 turns in a direction indicated by an arrow T. In association with the turning of the downstream steering shaft 91, the intermediate transmission plate 93 turns in the direction indicated by the arrow T about the front intermediate steering axis SIF relative to the link support 212.

In association with the turning of the intermediate transmission plate 93 in the direction indicated by the arrow T, the intermediate joint 96 turns relative to the intermediate transmission plate 93 in a direction indicated by an arrow S. This causes the tie-rod 99 to move to the left in the left-right direction of the body frame 21 and to the rear in the front-rear direction of the body frame 21 while maintaining its posture.

In association with the movement of the tie-rod 99, the left joint 97 and the right joint 98 turn in the direction indicated by the arrow S relative to the left transmission plate 94 and the right transmission plate 95, respectively. This turns the left transmission plate 94 and the right transmission plate 95 in the direction indicated by the arrow T while allowing the tie-rod 99 to maintain its posture.

When the left transmission plate 94 turns in the direction indicated by the arrow T, the left bracket 71, which is not able to turn relative to the left transmission plate 94, is turned in the direction indicated by the arrow T about the left steering axis SL relative to the left side member 53.

When the right transmission plate 95 turns in the direction indicated by the arrow T, the right bracket 81, which is not able to turn relative to the right transmission plate 95, is turned in the direction indicated by the arrow T about the right steering axis SR relative to the right side member 54.

When the left bracket 71 is turned in the direction indicated by the arrow T, the left shock absorber 72, which is supported on the left bracket 71, is turned in the direction indicated by the arrow T about the left steering axis SL relative to the left side member 53. When the left shock absorber 72 is turned in the direction indicated by the arrow T, the left front wheel 31, which is supported on the left shock absorber 72, is turned in the direction indicated by the arrow T about the left steering axis SL relative to the left side member 53.

When the right bracket 81 is turned in the direction indicated by the arrow T, the right shock absorber 82, which is supported on the right bracket 81, is turned in the direction indicated by the arrow T about the right steering axis SR relative to the right side member 54. When the right shock absorber 82 is turned in the direction indicated by the arrow T, the right front wheel 32, which is supported on the right shock absorber 82, is turned in the direction indicated by the arrow T about the right steering axis SR relative to the right side member 54.

When the rider operates the handlebar 61 so as to turn to the right, the elements described above turn in opposite directions to the directions in which they turn when the vehicle turns to the left. Since the elements merely move the other way around in relation to the left-right direction, detailed description thereof will be omitted here.

Thus, as has been described above, the steering member 6 transmits the steering force to the left front wheel 31 and the right front wheel 32 in response to the operation of the handlebar 61 by the rider. The left front wheel 31 and the right front wheel 32 turn about the left steering axis SL and the right steering axis SR, respectively, in the direction corresponding to the direction in which the handlebar 61 is operated by the rider.

Figure 6:
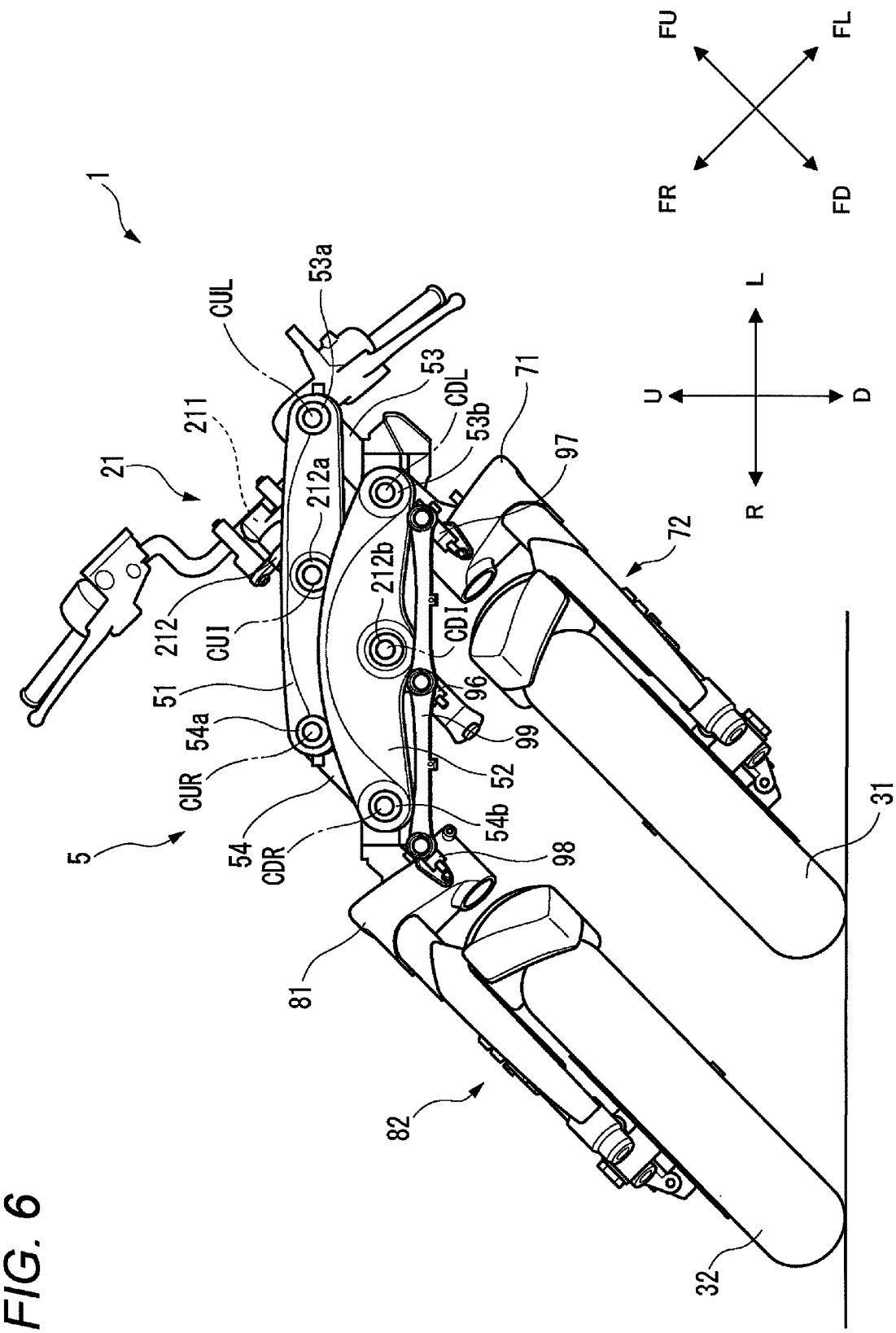
FIG. 6 is a front view showing the front portion of the vehicle of FIG. 1 when leaning is performed.

Next, referring to FIGS. 3 and 6, a leaning operation of the vehicle 1 will be described. FIG. 6 is a front view of the front portion of the vehicle 1, when viewed from the front in the front-rear direction of the body frame 21, with the body frame 21 caused to lean to the left of the vehicle 1. In FIG. 6, the headlamp unit 26, the headlamp support 214, the left side cover 221 and the right side cover 222 are omitted from illustration.

As shown in FIG. 3, when looking at the vehicle 1 from the front of the body frame 21 that is standing upright, the linkage 5 has a rectangular shape. As shown in FIG. 6, when looking at the vehicle 1 from the front of the body frame 21 that is leaning, the linkage 5 has a parallelogram shape. The operation of the linkage 5 is interlocked with the leaning of the body frame 21 in the left-right direction. The operation of the linkage 5 means that the shape of the linkage 5 changes as a result of the upper cross member 51 and the lower cross member 52 turning relative to the link support 212 about the upper intermediate connecting axis CUI and the lower intermediate connecting axis CDI, respectively, and the upper cross member 51, the lower cross member 52, the left side member 53 and the right side member 54 turning relatively about the upper left connecting axis CUL, the upper right connecting axis CUR, the lower left connecting axis CDL and the lower right connecting axis CDR, respectively.

For example, as shown in FIG. 6, when the rider causes the vehicle 1 to lean to the left, the head pipe 211 and the link support 212 lean to the left from the vertical direction. When the head pipe 211 and the link support 212 lean, the upper cross member 51 turns counterclockwise about the upper intermediate connecting axis CUI that passes the upper intermediate connector 212a relative to the link support 212 when viewed from the front of the vehicle 1. Similarly, the lower cross member 52 is turned counterclockwise about the lower intermediate connecting axis CDI that passes the lower intermediate connector 212b relative to the head pipe 211 when viewed from the front of the vehicle 1. This causes the upper cross member 51 to move to the left in the left-right direction of the body frame 21 relative to the lower cross member 52.

By moving in the way described above, the upper cross member 51 turns counterclockwise about the upper left connecting axis CUL that passes the upper left connector 53a and the upper right connecting axis CUR that passes the upper right connector 54a relative to the left side member 53 and the right side member 54, respectively when viewed from the front of the vehicle 1. Similarly, the lower cross member 52 turns counterclockwise about the lower left connecting axis CDL that passes the lower left connector 53b and the lower right connecting axis CDR that passes the lower right connector 54b relative to the left side member 53 and the right side member 54, respectively, when viewed from the front of the vehicle 1. By moving in the way described above, the left side member 53 and the right side member 54 lean to the left of the vehicle 1 from the vertical direction while maintaining postures that are parallel to the head pipe 211 and the link support 212.

As this occurs, the lower cross member 52 moves to the left in the left-right direction of the body frame 21 relative to the tie-rod 99. As a result of the lower cross member 52 moving in the way described above, the shafts that are provided at the respective front portions of the intermediate joint 96, the left joint 97 and the right joint 98 turn relative to the tie-rod 99. This allows the tie-rod 99 to hold a posture that is parallel to the upper cross member 51 and the lower cross member 52.

As the left side member 53 leans to the left of the vehicle 1, the left bracket 71 that is supported on the left side member 53 via the left turning member leans to the left of the vehicle 1. In association with the leftward leaning of the left bracket 71, the left shock absorber 72 that is supported on the left bracket 71 also leans to the left of the vehicle 1. As a result of the left shock absorber 72 leaning in the way described above, the left front wheel 31 that is supported on the left shock absorber 72 leans to the left of the vehicle 1 while maintaining a posture that is parallel to the head pipe 211 and the link support 212.

As the right side member 54 leans to the left of the vehicle 1, the right bracket 81 that is supported on the right side member 54 via the right turning member leans to the left of the vehicle 1. In association with the leftward leaning of the right bracket 81, the right shock absorber 82 that is supported on the right bracket 81 also leans to the left of the vehicle 1. As a result of the right shock absorber 82 leaning in the way described above, the right front wheel 32 that is supported on the right shock absorber 82 leans to the left of the vehicle 1 while maintaining a posture that is parallel to the head pipe 211 and the link support 212.

The description of the leaning operations of the left front wheel 31 and the right front wheel 32 is made based on the vertical direction. However, when the vehicle 1 leans (when the linkage 5 is operated), the up-down direction of the body frame 21 is not coincident with the vertical direction. In the event of this being described based on the up-down direction of the body frame 21, when the linkage 5 is operated, the left front wheel 31 and the right front wheel 32 change their relative positions in the up-down direction of the body frame 21. In other words, the linkage 5 changes the relative positions of the left front wheel 31 and the right front wheel 32 in the up-down direction of the body frame 21 to cause the body frame 21 to lean to the left or right of the vehicle 1 from the vertical direction.

When the rider causes the vehicle 1 to lean to the right, the elements lean to the right. Since the elements merely move the other way around in relation to the left-right direction, detailed description thereof will be omitted here.

Figure 7:
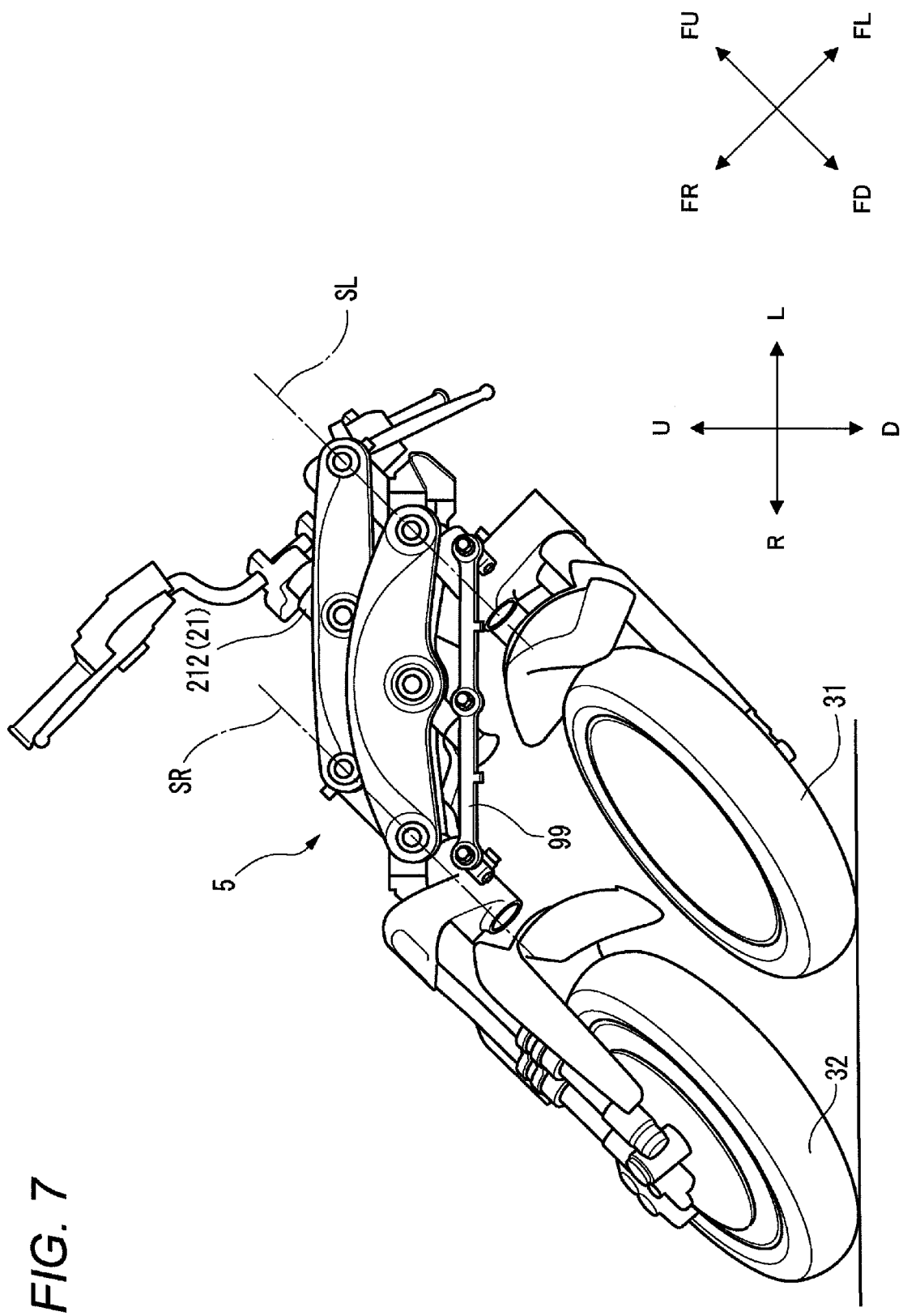
FIG. 7 is a front view showing the front portion of the vehicle of FIG. 1 when steering and leaning are performed.

FIG. 7 is a front view of the front portion of the vehicle 1, when viewed from the front in the front-rear direction of the body frame 21, in such a state that the vehicle 1 is caused to lean and turned. FIG. 7 shows a state in which the vehicle 1 is steered or turned to the left while being caused to lean to the left. In FIG. 7, the headlamp unit 26, the headlamp support 214, the left side cover 221 and the right side cover 222 are omitted from illustration.

When a steering operation is performed, the left front wheel 31 is turned counterclockwise about the left steering axis SL, while the right front wheel 32 is turned counterclockwise about the right steering axis SR. When a leaning operation is performed, the left front wheel 31 and the right front wheel 32 lean to the left of the vehicle 1 together with the body frame 21. Namely, in this state, the linkage 5 has the parallelogram shape. The tie-rod 99 moves to the left in the left-right direction of the body frame 21 and to the rear in the front-rear direction of the body frame 21 from the position where the body frame 21 is in the upright state.

Next, referring to FIGS. 8 to 11, the configurations of the left side cover 221 and the right side cover 222 will be described in detail.

Figure 8:
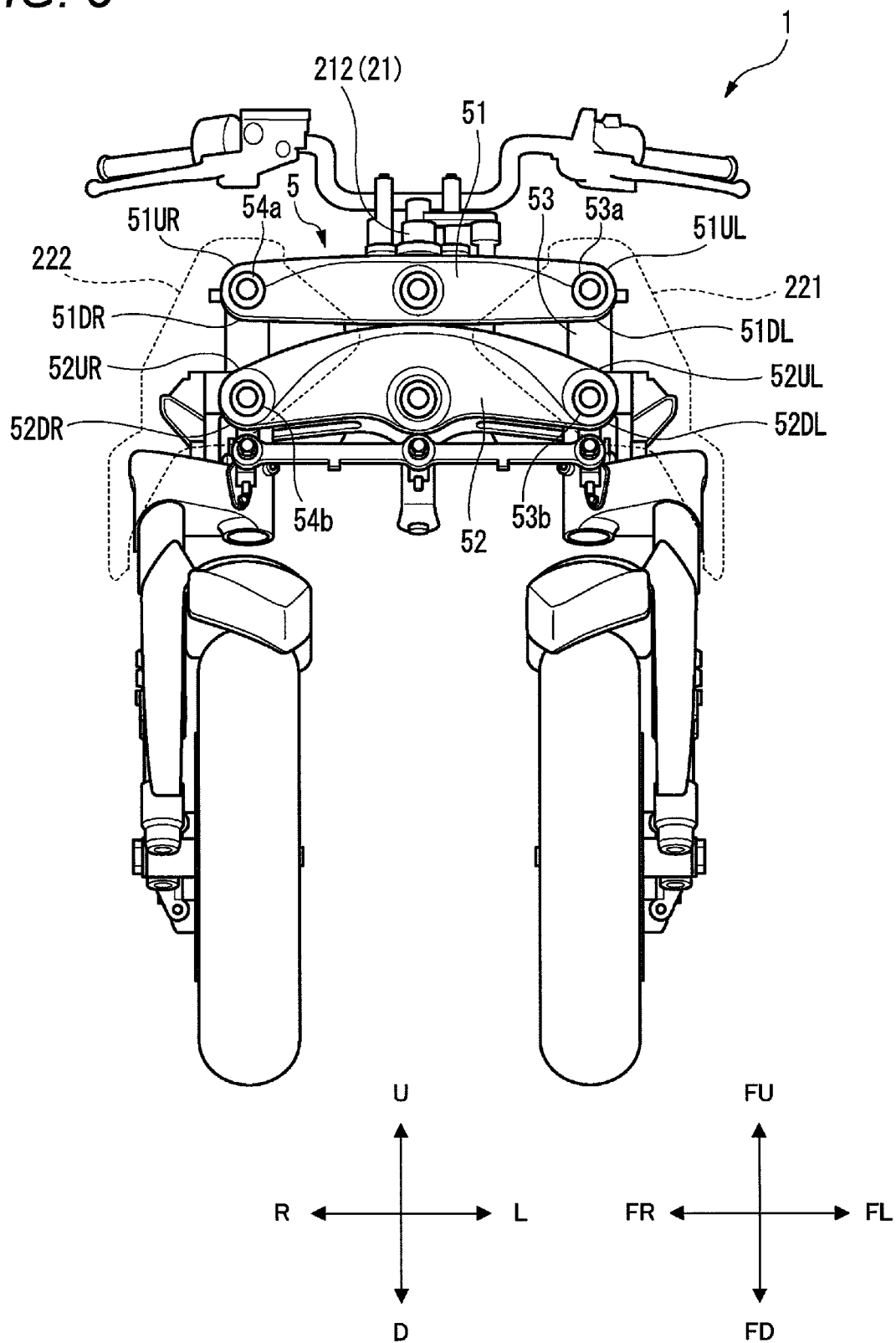
FIG. 8 is a front view showing the front portion of the vehicle of FIG. 1 with a left side cover and a right side cover.

FIG. 8 is a front view of the front portion of the vehicle 1 as viewed from the front in the front-rear direction of the body frame 21. In FIG. 8, the body frame 21 is in the upright state. The following description to be made while referring to FIG. 8 is based on the premise that the body frame 21 is in the upright state. In FIG. 8, the illustration of the headlamp unit 26 and the headlamp support 214 is omitted. FIG. 8 shows a state as seen through the left side cover 221 and the right side cover 222 that are indicated by dashed lines.

The inventor of preferred embodiments of the present invention discovered that an intrusion of foreign matter into portions where arbitrary two members among the upper cross member 51, the lower cross member 52, the left side member 53 and the right side member 54 overlap each other in the front-rear direction of the body frame 21 can particularly cause a problem with the operation of the linkage 5. The intrusion of foreign matter can occur at these portions since the pair of members change their relative posture while overlapping each other in the front-rear direction of the body frame 21.

More specifically, it was discovered that the intrusion of foreign matter can occur at the following portions. A left upper edge 51UL that is a portion of an upper edge of the upper cross member 51 and which overlaps the left side member 53 as viewed from the front in the front-rear direction of the body frame 21, a left lower edge 51DL that is a portion of a lower edge of the upper cross member 51 and which overlaps the left side member 53 as viewed from the front in the front-rear direction of the body frame 21, a left upper edge 52UL that is a portion of an upper edge of the lower cross member 52 and which overlaps the left side member 53 as viewed from the front in the front-rear direction of the body frame 21, a left lower edge 52DL that is a portion of a lower edge of the lower cross member 52 and which overlaps the left side member 53 as viewed from the front in the front-rear direction of the body frame 21, a right upper edge 51UR that is a portion of the upper edge of the upper cross member 51 and which overlaps the right side member 54 as viewed from the front in the front-rear direction of the body frame 21, a right lower edge 51DR that is a portion of the lower edge of the upper cross member 51 and which overlaps the right side member 54 as viewed from the front in the front-rear direction of the body frame 21, a right upper edge 52UR that is a portion of the upper edge of the lower cross member 52 and which overlaps the right side member 54 as viewed from the front in the front-rear direction of the body frame 21, and a right lower edge 52DR that is a portion of the lower edge of the lower cross member 52 and which overlaps the right side member 54 as viewed from the front in the front-rear direction of the body frame 21.

The inventor conceived that the enlargement in size of the front portion of the vehicle is able to be prevented while enabling the prevention or reduction of intrusion of foreign matter into the linkage by attaching, to the left side member 53, the left side cover 221 (an example of a left cover) that covers at least one of the left upper edge 51UL of the upper cross member 51, the left lower edge 51DL of the upper cross member 51, the left upper edge 52UL of the lower cross member 52 and the left lower edge 52DL of the lower cross member 52 from the left in the left-right direction of the body frame 21 together with the left side member 53, and by attaching, to the right side member 54, the right side cover 222 (an example of a right cover) that covers at least one of the right upper edge 51UR of the upper cross member 51, the right lower edge 51DR of the upper cross member 51, the right upper edge 52UR of the lower cross member 52 and the right lower edge 52DR of the lower cross member 52 from the right in the left-right direction of the body frame 21 together with the right side member 54.

According to this configuration, as the linkage 5 operates, the left side cover 221 is displaced together with the left side member 53 relative to the body frame 21, and the right side cover 222 is displaced together with the right side member 54 relative to the body frame 21. In other words, the relative position of the left side cover 221 to the left side member 53 and the relative position of the right side cover 222 to the right side member 54 do not change substantially even though the linkage 5 operates. Consequently, the left side cover 221 and the right side cover 222 do not have to continue to cover entire portions that need to be protected and hence could have a required minimum area. In addition, since the relative positions do not change substantially even though the linkage 5 operates, there is no need to consider the interference of the left side cover 221 with the left side member 53 and the interference of the right side cover 222 with the right side member 54. Consequently, the left side cover 221 and the right side cover 222 are easily disposed closely to the portion required to be protected. As a result, it is possible to prevent the enlargement in size of the front portion of the vehicle 1 while preventing or significantly reducing the intrusion of foreign matter into the linkage 5 particularly from the lateral side.

Figure 9:
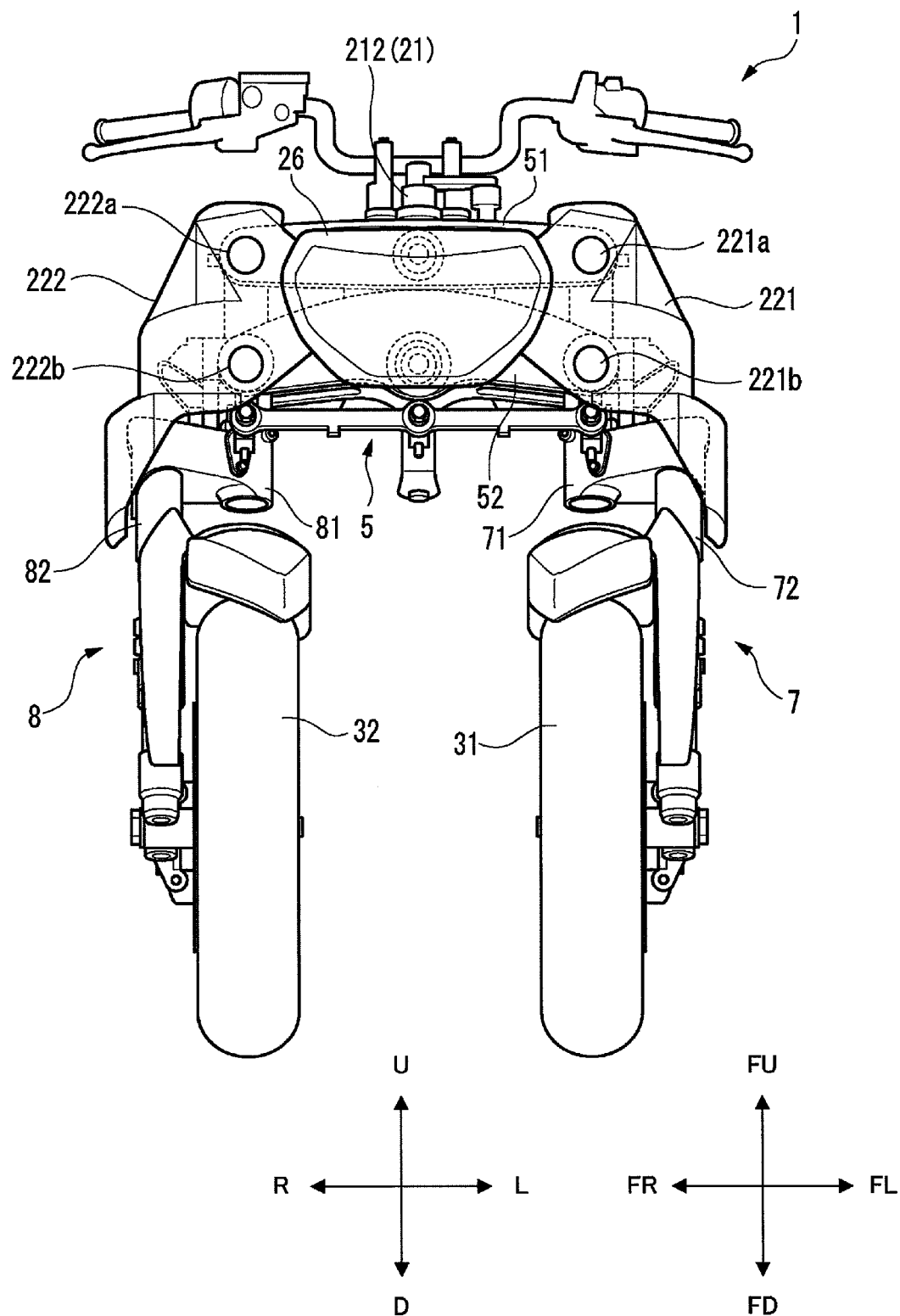
FIG. 9 is a front view showing the front portion of the vehicle of FIG. 1 with the left side cover, the right side cover and the headlamp unit.

FIG. 9 is a front view of the front portion of the vehicle 1 as viewed from the front in the front-rear direction of the body frame 21. In FIG. 9, the body frame 21 is in the upright state. The following description to be made while referring to FIG. 9 is based on the premise that the body frame 21 is in the upright state.

The left side cover 221 includes an upper left attachment 221a and a lower left attachment 221b. The upper left attachment 221a is attached to the upper left connector 53a (refer to FIG. 8) of the left side member 53. The lower left attachment 221b is attached to the lower left connector 53b (refer to FIG. 8) of the left side member 53.

The right side cover 222 includes an upper right attachment 222a and a lower right attachment 222b. The upper right attachment 222a is attached to the upper right connector 54a (refer to FIG. 8) of the right side member 54. The lower right attachment 222b is attached to the lower right connector 54b (refer to FIG. 8) of the right side member 54.

Figure 10:
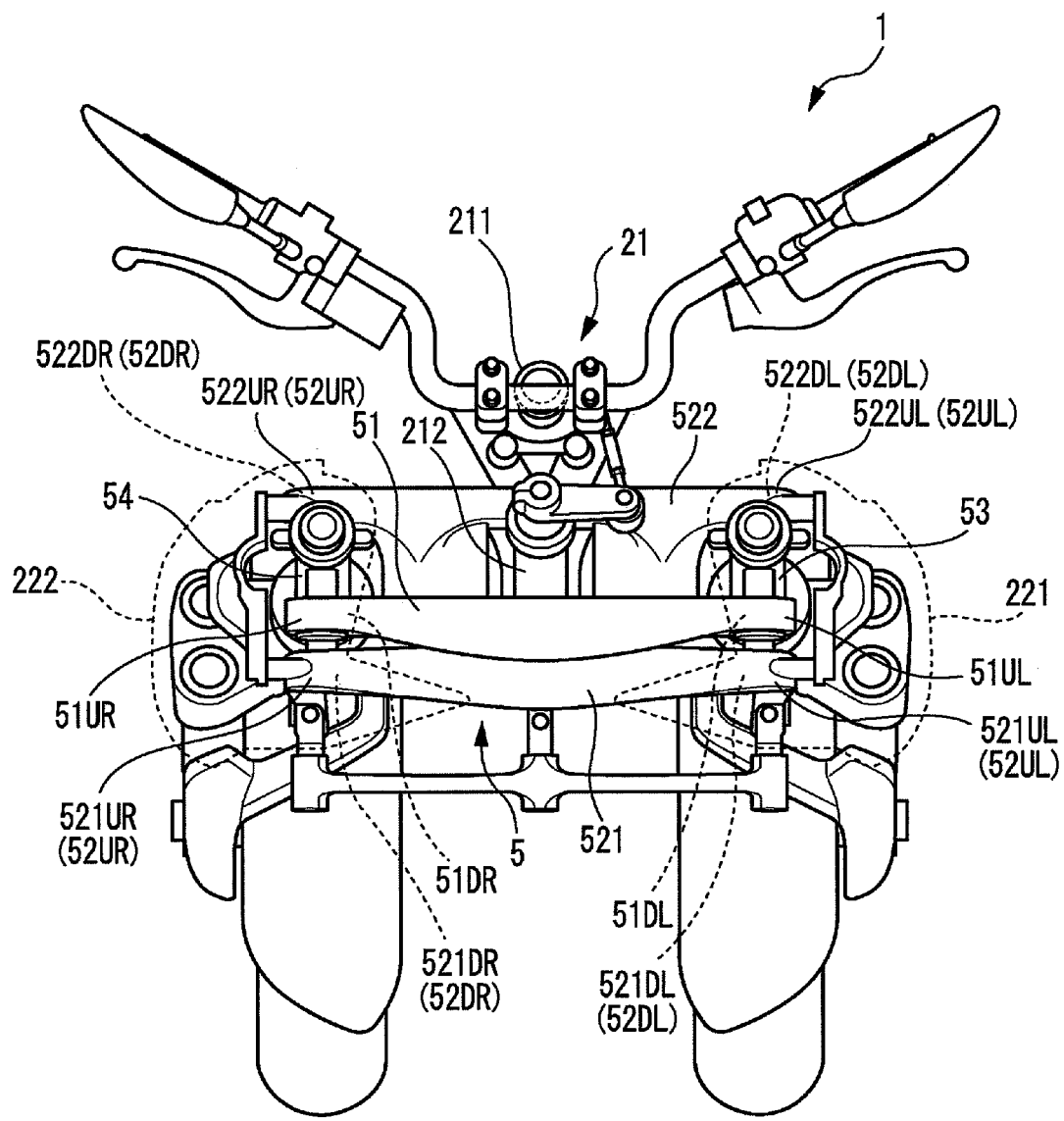
FIG. 10 is a plan view showing the front portion of the vehicle of FIG. 1 with the left side cover and the right side cover.
Figure 10:
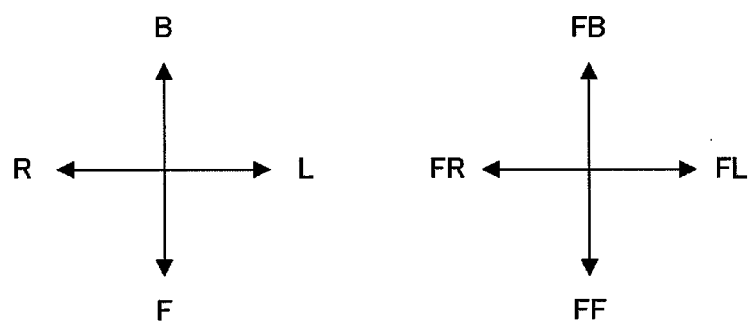
Figure 11:
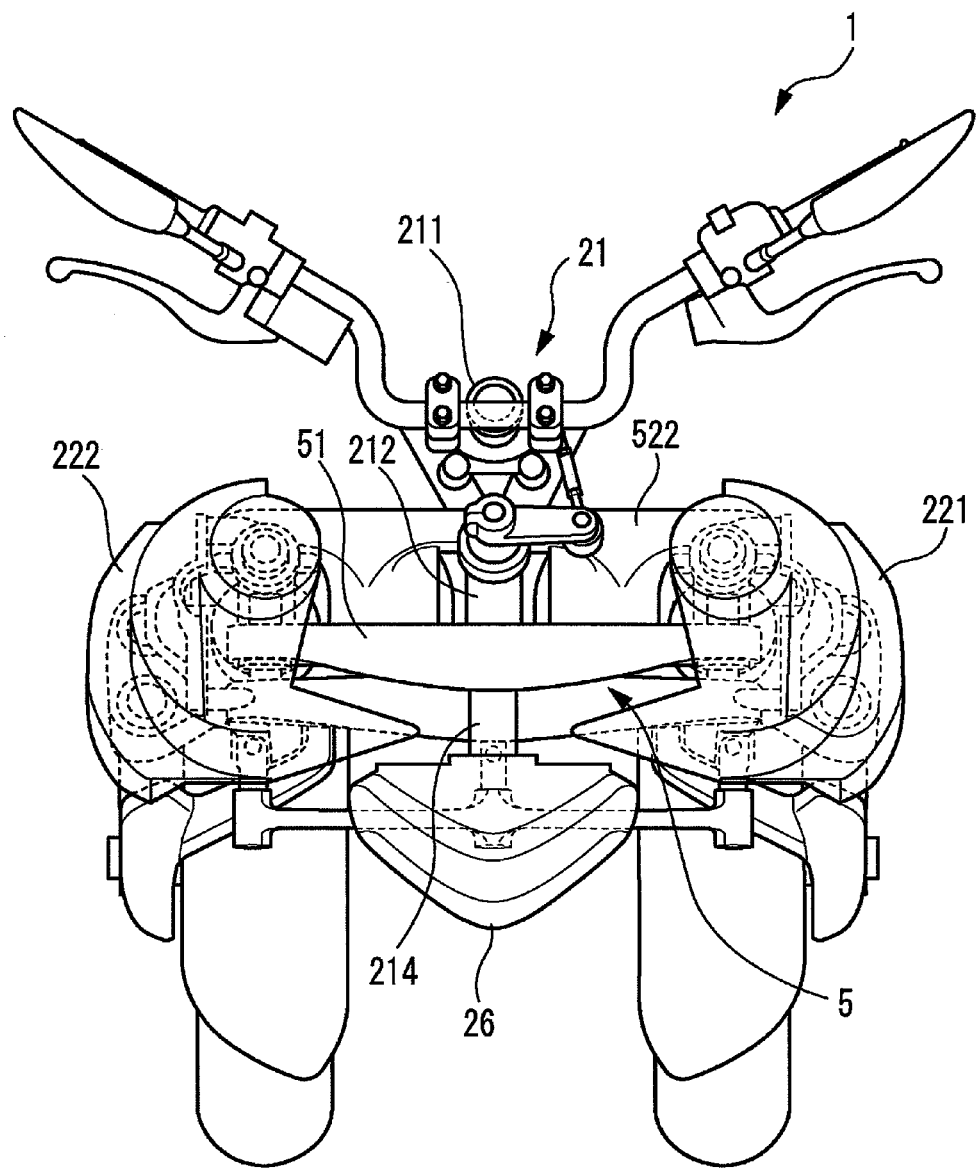
FIG. 11 is a plan view showing the front portion of the vehicle of FIG. 1 with the left side cover, the right side cover and the headlamp unit.
Figure 11:
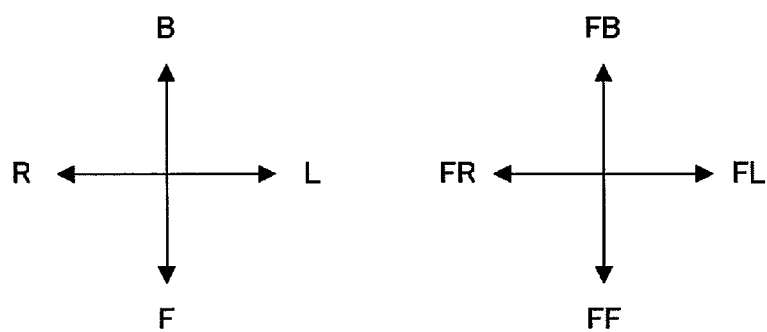

FIGS. 10 and 11 are plan views of the front portion of the vehicle 1 when viewed from above in the up-down direction of the body frame 21. In FIGS. 10 and 11, the body frame 21 is in the upright state. The following description to be made while referring to FIGS. 10 and 11 is based on the premise that the body frame 21 is in the upright state. In FIG. 10, the illustration of the headlamp unit 26 and the headlamp support 214 is omitted. FIG. 10 shows a state as seen through the left side cover 221 and the right side cover 222 that are indicated by dashed lines.

As is clear from FIGS. 8 and 11, the left side cover 221 covers the left upper edge 51UL of the upper cross member 51, the left lower edge 51DL of the upper cross member 51, the left upper edge 52UL of the lower cross member 52 and the left lower edge 52DL of the lower cross member 52 from the left in the left-right direction of the body frame 21 together with the left side member 53.

On the other hand, the right side cover 222 covers the right upper edge 51UR of the upper cross member 51, the right lower edge 51DR of the upper cross member 51, the right upper edge 52UR of the lower cross member 52 and the right lower edge 52DR of the lower cross member 52 from the right in the left-right direction of the body frame 21 together with the right side member 54.

As described above, the lower cross member 52 includes the front element 521 and the rear element 522. The front element 521 is disposed directly ahead of the rear element 522 in a direction that follows the lower intermediate connecting axis CDI (refer to FIG. 3) of the lower intermediate connector 212b. The rear element 522 is disposed directly behind the front element 521 in the direction that follows the lower intermediate connecting axis CDI (refer to FIG. 3) of the lower intermediate connector 212b.

As shown in FIG. 10, the left upper edge 52UL of the lower cross member 52 includes a left upper edge 521UL of the front element 521 and a left upper edge 522UL of the rear element 522. The left upper edge 521UL is a portion of an upper edge of the front element 521. The left upper edge 522UL is a portion of an upper edge of the rear element 522. The left lower edge 52DL of the lower cross member 52 includes a left lower edge 521DL of the front element 521 and a left lower edge 522DL of the rear element 522. The left lower edge 521DL is a portion of a lower edge of the front element 521. The left lower edge 522DL is a portion of a lower edge of the rear element 522. The right upper edge 52UR of the lower cross member 52 includes a right upper edge 521UR of the front element 521 and a right upper edge 522UR of the rear element 522. The right upper edge 521UR is a portion of the upper edge of the front element 521. The right upper edge 522UR is a portion of the upper edge of the rear element 522. The right lower edge 52DR of the lower cross member 52 includes a right lower edge 521DR of the front element 521 and a right lower edge 522DR of the rear element 522. The right lower edge 521DR is a portion of the lower edge of the front element 521. The right lower edge 522DR is a portion of the lower edge of the rear element 522.

The left upper edge 521UL of the front element 521, the left lower edge 521DL of the front element 521, the left upper edge 522UL of the rear element 522 and the left lower edge 522DL of the rear element 522 overlap the left side member 53 as viewed from the front in the front-rear direction of the body frame 21. The right upper edge 521UR of the front element 521, the right lower edge 521DR of the front element 521, the right upper edge 522UR of the rear element 522 and the right lower edge 522DR of the rear element 522 overlap the right side member 54 as viewed from the front in the front-rear direction of the body frame 21.

As is clear from FIGS. 10 and 11, the left side cover 221 covers the left upper edge 521UL of the front element 521, the left lower edge 521DL of the front element 521, the left upper edge 522UL of the rear element 522 and the left lower edge 522DL of the rear element 522 from the left in the left-right direction of the body frame 21 together with the left side member 53.

Likewise, the right side cover 222 covers the right upper edge 521UR of the front element 521, the right lower edge 521DR of the front element 521, the right upper edge 522UR of the rear element 522 and the right lower edge 522DR of the rear element 522 from the right in the left-right direction of the body frame 21 together with the right side member 54.

In the vehicle 1 according to the present preferred embodiment, as shown in FIG. 9, the left side cover 221 covers a portion of the left suspension 7 from the left in the left-right direction of the body frame 21. Specifically, the left bracket 71 and a portion of the left shock absorber 72 are covered by the left side cover 221.

On the other hand, the right side cover 222 covers a portion of the right suspension 8 from the right in the left-right direction of the body frame 21. Specifically, the right bracket 81 and a portion of the right shock absorber 82 are covered by the right side cover 222.

Foreign matter might intrude into a space between the lower cross member 52 and the left suspension 7 whose relative posture changes as the linkage 5 operates as well as a space between the lower cross member 52 and the right suspension 8 whose relative posture changes as the linkage 5 operates. According to the configuration described above, the left side cover 221 and the right side cover 222 also protect the portions concerned. Consequently, it is possible to prevent the enlargement in size of the front portion of the vehicle 1 while preventing or further reducing the intrusion of foreign matter into the linkage 5.

In the vehicle 1 according to the present preferred embodiment, as shown in FIGS. 9 and 11, the left side cover 221 covers the left upper edge 51UL of the upper cross member 51, the left lower edge 51DL of the upper cross member 51, the left upper edge 52UL of the lower cross member 52 and the left lower edge 52DL of the lower cross member 52 from the front in the front-rear direction of the body frame 21.

On the other hand, the right side cover 222 covers the right upper edge 51UR of the upper cross member 51, the right lower edge 51DR of the upper cross member 51, the right upper edge 52UR of the lower cross member 52 and the right lower edge 52DR of the lower cross member 52 from the front in the front-rear direction of the body frame 21.

According to this configuration, the intrusion of foreign matter into the linkage 5 is prevented or significantly reduced not only from the lateral sides but also from the front of the linkage 5. Consequently, it is possible to prevent the enlargement in size of the front portion of the vehicle 1 while preventing or further reducing the intrusion of foreign matter into the linkage 5.

As described above, the vehicle 1 according to the present preferred embodiment includes the headlamp unit 26 (an example of an exterior portion). As shown in FIGS. 9 and 11, the headlamp unit 26 is supported by the headlamp support 214 that defines a portion of the body frame 21 at a position between the left side member 53 and the right side member 54. A portion of the left side cover 221 and a portion of the right side cover 222 overlap the headlamp unit 26 when the vehicle 1 standing upright is viewed from the front in the front-rear direction of the body frame 21.

According to this configuration, the intrusion of foreign matter into the linkage 5 from the front is prevented or significantly reduced in cooperation with the exterior portion that is inherently equipped on the vehicle 1. When the vehicle 1 leans to the left or right, a right end of the left side cover 221 and a left end of the right side cover 222 approach each other. In order to avoid interference therebetween, a distance between the left side cover 221 and the right side cover 222 in the left-right direction of the body frame 21 needs to be ensured to a certain extent. Also in this case, the function to prevent or reduce the intrusion of foreign matter is assigned to the exterior portion that is disposed between the right end of the left side cover 221 and the left end of the right side cover 222. Accordingly, the area of the left side cover 221 and the right side cover 222 is small. Consequently, it is possible to prevent further the enlargement in size of the front portion of the vehicle 1 while preventing or further reducing the intrusion of foreign matter into the linkage 5.

In the vehicle 1 according to the present preferred embodiment, as shown in FIG. 9, the left side cover 221 is attached to the left side member 53 via the upper left attachment 221a and the lower left attachment 221b (an example of a plurality of left attachments). The upper left attachment 221a and the lower left attachment 221b are spaced apart in a direction in which the left side member 53 extends (a direction following the left steering axis SL).

On the other hand, the right side cover 222 is attached to the right side member 54 via the upper right attachment 222a and the lower right attachment 222b (an example of a plurality of right attachments). The upper right attachment 222a and the lower right attachment 222b are spaced apart in a direction in which the right side member 54 extends (a direction following the right steering axis SR).

According to this configuration, the supporting rigidity of the left side cover 221 and the right side cover 222 is improved, thus enhancing the stability during displacement of the left side member 53 and the right side member 54 that occurs as the linkage 5 operates. Consequently, it is possible to prevent the enlargement in size of the front portion of the vehicle 1 while preventing or further reducing the intrusion of foreign matter into the linkage 5.

In the vehicle 1 according to the present preferred embodiment, as described above, the left side cover 221 is attached to the left side member 53 via the upper left connector 53a and the lower left connector 53b. On the other hand, the right side cover 222 is attached to the right side member 54 via the upper right connector 54a and the lower right connector 54b.

According to this configuration, the left side cover 221 and the right side cover 222 are attached accordingly using the upper left connector 53a, the lower left connector 53b, the upper right connector 54a and the lower right connector 54b that are inherently equipped on the linkage 5. Thus, independent attachments do not have to be provided on the left side member 53 and the right side member 54, thus making it possible to prevent the enlargement in size of the left side member 53 and the right side member 54. Consequently, it is possible to prevent further the enlargement in size of the front portion of the vehicle 1 while preventing or significantly reducing the intrusion of foreign matter into the linkage 5.

The preferred embodiments that have been described above are intended to facilitate the understanding of the present invention and is not intended to limit the present invention. Preferred embodiments of the present invention can be modified without departing from the scope thereof and that their equivalents can also be included in the present invention.

In the preferred embodiments described above, the left side cover 221 covers all of the left upper edge 51UL of the upper cross member 51, the left lower edge 51DL of the upper cross member 51, the left upper edge 52UL of the lower cross member 52 and the left lower edge 52DL of the lower cross member from the left in the left-right direction of the body frame 21 together with the left side member 53. However, the left side cover 221 may cover at least one of the left upper edge 51UL of the upper cross member 51, the left lower edge 51DL of the upper cross member 51, the left upper edge 52UL of the lower cross member 52 and the left lower edge 52DL of the lower cross member 52 from the left in the left-right direction of the body frame 21 together with the left side member 53.

Figure 12:
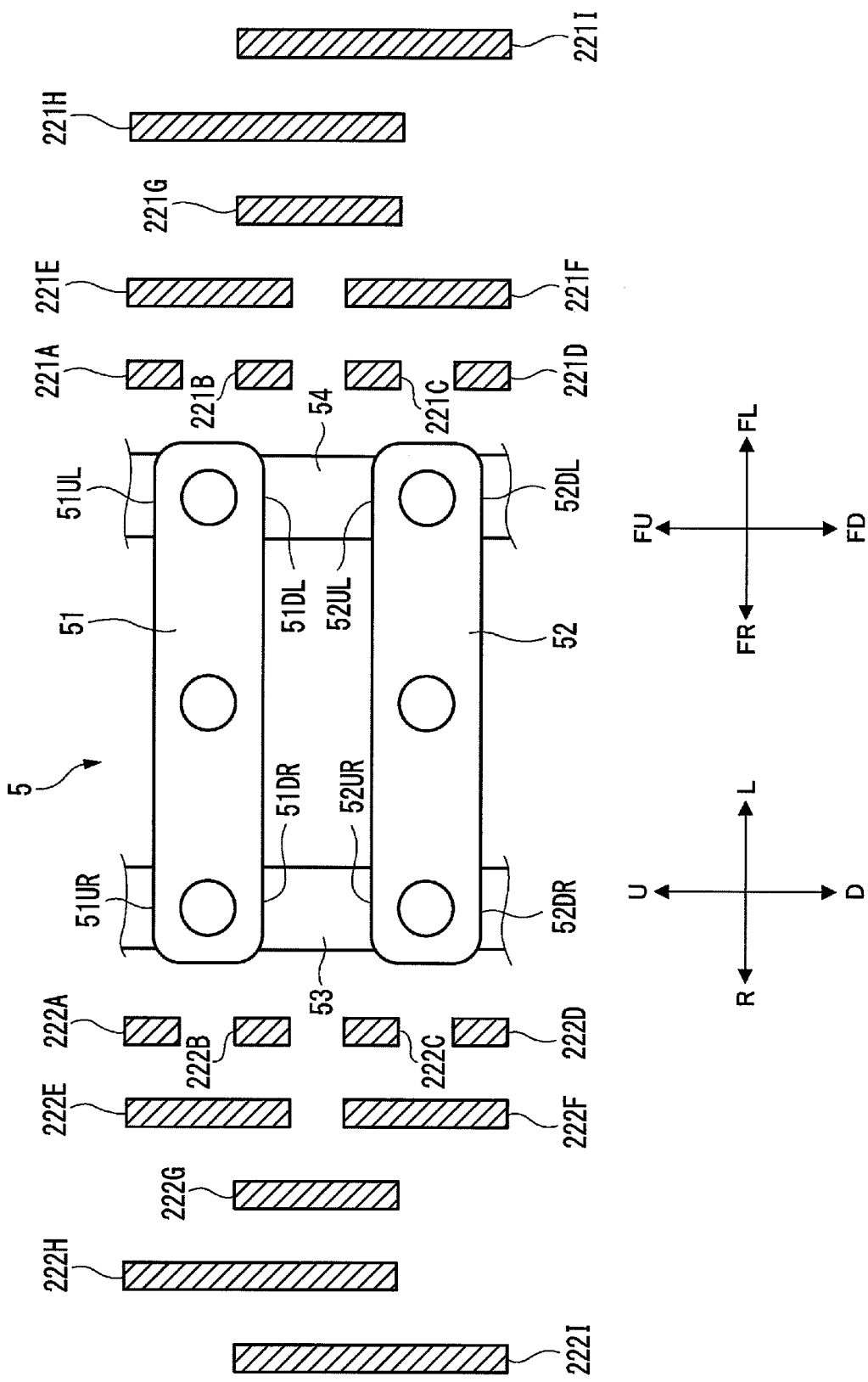
FIG. 12 is a schematic diagram showing modified examples of the left side cover and the right side cover.

For example, as shown in FIG. 12, it is possible to provide at least one of a left side cover 221A that exclusively covers the left upper edge 51UL of the upper cross member 51, a left side cover 221B that exclusively covers the left lower edge 51DL of the upper cross member 51, a left side cover 221C that exclusively covers the left upper edge 52UL of the lower cross member 52, and a left side cover 221D that exclusively covers the left lower edge 52DL of the lower cross member 52.

Alternatively, it is possible to provide at least one of a left side cover 221E that exclusively covers the left upper edge 51UL of the upper cross member 51 and the left lower edge 51DL of the upper cross member 51 and a left side cover 221F that exclusively covers the left upper edge 52UL of the lower cross member 52 and the left lower edge 52DL of the lower cross member 52.

Alternatively, it is possible to provide a left side cover 221G that exclusively covers the left lower edge 51DL of the upper cross member 51 and the left upper edge 52UL of the lower cross member 52. The left side cover 221G may be provided in combination with at least one of the left side cover 221A and the left side cover 221D.

Alternatively, it is possible to provide a left side cover 221H that covers the left upper edge 51UL of the upper cross member 51, the left lower edge 51DL of the upper cross member 51, and the left upper edge 52UL of the lower cross member 52. The left side cover 221H may be provided in combination with the left side cover 221D.

Alternatively, it is possible to provide a left side cover 221I that covers the left lower edge 51DL of the upper cross member 51, the left upper edge 52UL of the lower cross member 52, and the left lower edge 52DL of the lower cross member 52. The left side cover 221I may be provided in combination with the left side cover 221A.

In the preferred embodiments described above, the right side cover 222 covers all of the right upper edge 51UR of the upper cross member 51, the right lower edge 51DR of the upper cross member 51, the right upper edge 52UR of the lower cross member 52 and the right lower edge 52DR of the lower cross member 52 from the right in the left-right direction of the body frame 21 together with the right side member 54. However, the right side cover 222 may cover at least one of the right upper edge 51UR of the upper cross member 51, the right lower edge 51DR of the upper cross member 51, the right upper edge 52UR of the lower cross member 52 and the right lower edge 52DR of the lower cross member 52 from the right in the left-right direction of the body frame 21 together with the right side member 54.

For example, as shown in FIG. 12, it is possible to provide at least one of a right side cover 222A that exclusively covers the right upper edge 51UR of the upper cross member 51, a right side cover 222B that exclusively covers the right lower edge 51DR of the upper cross member 51, a right side cover 222C that exclusively covers the right upper edge 52UR of the lower cross member 52, and a right side cover 222D that exclusively covers the right lower edge 52DR of the lower cross member 52.

Alternatively, it is possible to provide at least one of a right side cover 222E that exclusively covers the right upper edge 51UL of the upper cross member 51 and the right lower edge 51DR of the upper cross member 51 and a right side cover 222F that exclusively covers the right upper edge 52UR of the lower cross member 52 and the right lower edge 52DR of the lower cross member 52.

Alternatively, it is possible to provide a right side cover 222G that exclusively covers the right lower edge 51DR of the upper cross member 51 and the right upper edge 52UR of the lower cross member 52. The right side cover 222G can be provided in combination with at least one of the right side cover 222A and the right side cover 222D.

Alternatively, it is possible to provide a right side cover 222H that covers the right upper edge 51UL of the upper cross member 51, the right lower edge 51DR of the upper cross member 51, and the right upper edge 52UR of the lower cross member 52. The right side cover 222H may be provided in combination with the right side cover 222D.

Alternatively, it is possible to provide a right side cover 222I that covers the right lower edge 51DR of the upper cross member 51, the right upper edge 52UR of the lower cross member 52, and the right lower edge 52DR of the lower cross member 52. The right side cover 222I may be provided in combination with the right side cover 222A.

In the preferred embodiments described above, the left side cover 221 is attached to the left side member 53 via the upper left connector 53a and the lower left connector 53b. However, the left side cover 221 may be attached to the left side member 53 via either of the upper left connector 53a and the lower left connector 53b. Alternatively, the left side cover 221 may be attached directly to the left side member 53 without involving either the upper left connector 53a or the lower left connector 53b.

In the preferred embodiments described above, the right side cover 222 is attached to the right side member 54 via the upper right connector 54a and the lower right connector 54b. However, the right side cover 222 may be attached to the right side member 54 via either of the upper right connector 54a and the lower right connector 54b. Alternatively, the right side cover 222 may be attached directly to the right side member 54 without using either the upper right connector 54a or the lower right connector 54b.

In the above preferred embodiments, the vehicle 1 includes a single rear wheel 4. However, the vehicle 1 may include a plurality of rear wheels.

In the preferred embodiments described above, the upper cross member 51 is a single plate member, while the lower cross member 52 includes the front element 521 and the rear element 522. However, a configuration may be used in which the upper cross member 51 also includes a front element and a rear element. A configuration may be used in which at least one of the upper cross member 51 and the lower cross member 52 includes a left plate member that is supported on the link support 212 and the left side member 53 and a right plate member that is supported on the link support 212 and the right side member 54.

In the above preferred embodiments, the handlebar 61 includes a single member that extends in the left-right direction of the body frame. However, a configuration may be used in which the handlebar 61 includes a left handlebar to be operated by the left hand of the rider and a right handlebar to be operated by the right hand of the rider that are provided as individual members, as long as steering force to turn the left front wheel 31 and the right front wheel 32 is able to be inputted through the handlebar 61.

In the above preferred embodiments, the steering force transmission 9 includes the intermediate transmission plate 93, the left transmission plate 94, the right transmission plate 95, the intermediate joint 96, the left joint 97, the right joint 98, and the tie-rod 99. However, the intermediate transmission plate 93, the left transmission plate 94, the right transmission plate 95, the intermediate joint 96, the left joint 97, and the right joint 98 may be replaced by appropriate mechanisms such as universal joints as required, as long as the steering force inputted from the handlebar 61 can be transmitted to the left suspension 7 and the right suspension 8 by way of the tie-rod 99.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of about ±40 degrees are included therein. When used in this description to depict directions and members, the expression reading "along a certain direction" means that a case where something inclines at an angle falling within the range of about ±40 degrees relative to the certain direction is included therein. When used in this description, the expression reading "something extends in a certain direction" means that a case where something extends while being inclined at an angle falling within the range of about ±40 degrees relative to the certain direction is included therein.

When used in this description, the expression "so as not to be movable relative to the body frame 21" means that a certain portion or member is caused to lean in the left-right direction of the vehicle 1 together with the body frame 21 when the body frame 21 is caused to lean in the left-right direction of the vehicle 1. When used in this description, the expression "so as not to be movable relative to the body frame 21" may include not only a case where a certain portion or member is directly fixed to the body frame but also a case where the certain portion or member is fixed to a vehicle component (a fuel tank, a bracket, the power unit 24, etc.) which is fixed on the body frame 21. Here the term "fixed" may include a case that a certain portion or member is fixed by way of a damping member or the like.

The present invention can be implemented with many different preferred embodiments. This description should be understood to provide preferred embodiments of the present invention. The preferred embodiments which are at least described or illustrated in this description is so described or illustrated based on the understanding that the preferred embodiments are not intended to limit the present invention.

The present invention includes every preferred embodiment which includes an equivalent element, a modification, a deletion, a combination (for example, a combination of characteristics of various preferred embodiments), an improvement and an alteration which can be recognized by those skilled in the art to which the present invention pertains based on the preferred embodiments disclosed in this description. The limitative matters of claims should be construed broadly based on terms used in the claims and hence should not be limited by the preferred embodiments described in this specification or the prosecution of this patent application. Those preferred embodiments should be construed as non-exclusive. For example, in this description, the terms "preferable" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame;
   a left front wheel and a right front wheel that are arranged side by side in a left-right direction of the body frame; and
   a linkage disposed above the left front wheel and the right front wheel in an up-down direction of the body frame, and that changes positions of the left front wheel and the right front wheel relative to the body frame to cause the body frame to lean to left or right of the vehicle; wherein
   the linkage includes an upper cross member, a lower cross member, a left side member, and a right side member;
   the upper cross member, the lower cross member, the left side member, and the right side member are connected such that the upper cross member and the lower cross member maintain postures that are parallel to each other, and such that the left side member and the right side member maintain postures that are parallel to each other;
   the vehicle further includes:
      a left cover attached to the left side member; and
      a right cover attached to the right side member;
   the left cover covers at least one of:
      a left upper edge defining a portion of an upper edge of the upper cross member, and overlapping the left side member as viewed from a front in a front-rear direction of the body frame;
      a left lower edge defining a portion of a lower edge of the upper cross member, and overlapping the left side member as viewed from the front in the front-rear direction of the body frame;
      a left upper edge defining a portion of an upper edge of the lower cross member, and overlapping the left side member as viewed from the front in the front-rear direction of the body frame; and
      a left lower edge defining a portion of a lower edge of the lower cross member, and overlapping the left side member as viewed from the front in the front-rear direction of the body frame, and from a left in the left-right direction of the body frame together with at least a portion of the left side member; and
   the right cover covers at least one of:
      a right upper edge defining a portion of an upper edge of the upper cross member, and overlapping the right side member as viewed from the front in the front-rear direction of the body frame;
      a right lower edge defining a portion of a lower edge of the upper cross member, and overlapping the right side member as viewed from the front in the front-rear direction of the body frame;
      a right upper edge defining a portion of an upper edge of the lower cross member, and overlapping the right side member as viewed from the front in the front-rear direction of the body frame; and
      a right lower edge defining a portion of a lower edge of the lower cross member, and overlapping the right side member as viewed from the front in the front-rear direction of the body frame, and from a right in the left-right direction of the body frame together with at least a portion of the right side member.

2. The vehicle according to claim 1, wherein the left cover covers the left upper edge of the lower cross member and the left lower edge of the lower cross member from the left in the left-right direction of the body frame, and the right cover covers the right upper edge of the lower cross member and the right lower edge of the lower cross member from the right in the left-right direction of the body frame.

3. The vehicle according to claim 2, wherein the left cover covers the left lower edge of the upper cross member from the left in the left-right direction of the body frame, and the right cover covers the right lower edge of the upper cross member from the right in the left-right direction of the body frame.

4. The vehicle according to claim 2, wherein the lower cross member is connected to a lower intermediate connector so as to be able to turn about a lower intermediate connecting axis;
   the lower cross member includes:
      a front element disposed directly ahead of the lower intermediate connector in a direction along the lower intermediate connecting axis; and
      a rear element disposed directly behind the lower intermediate connector in the direction along the lower intermediate connecting axis;
   the left upper edge of the lower cross member includes:
      a left upper edge defining a portion of an upper edge of the front element, and overlapping the left side member as viewed from the front in the front-rear direction of the body frame; and
      a left upper edge defining a portion of an upper edge of the rear element, and overlapping the left side member as viewed from the front in the front-rear direction of the body frame;
   the left lower edge of the lower cross member includes:
      a left lower edge defining a portion of a lower edge of the front element, and overlapping the left side member as viewed from the front in the front-rear direction of the body frame; and
      a left lower edge defining a portion of a lower edge of the rear element, and overlapping the left side member as viewed from the front in the front-rear direction of the body frame;
   the right upper edge of the lower cross member includes:
      a right upper edge defining a portion of the upper edge of the front element, and overlapping the right side member as viewed from the front in the front-rear direction of the body frame; and
      a right upper edge defining a portion of the upper edge of the rear element, and overlapping the right side member as viewed from the front in the front-rear direction of the body frame; and the right lower edge of the lower cross member includes:

a right lower edge defining a portion of the lower edge of the front element, and overlapping the right side member as viewed from the front in the front-rear direction of the body frame; and a right lower edge defining a portion of the lower edge of the rear element, and overlapping the right side member as viewed from the front in the front-rear direction of the body frame.

5. The vehicle according to claim 1, further comprising:

a left suspension supporting the left front wheel and supported on the left side member; and a right suspension supporting the right front wheel and supported on the right side member; wherein the left cover at least partially covers the left suspension from the left in the left-right direction of the body frame; and the right cover at least partially covers the right suspension from the right in the left-right direction of the body frame.

6. The vehicle according to claim 1, wherein the left cover covers at least one of the left upper edge of the upper cross member, the left lower edge of the upper cross member, the left upper edge of the lower cross member, and the left lower edge of the lower cross member, from the front in the front-rear direction of the body frame; and the right cover covers at least one of the right upper edge of the upper cross member, the right lower edge of the upper cross member, the right upper edge of the lower cross member, and the right lower edge of the lower cross member, from the front in the front-rear direction of the body frame.

7. The vehicle according to claim 6, further comprising:

an exterior portion supported at a position between the left side member and the right side member as viewed from the front in the front-rear direction of the body frame; wherein the left cover and the right cover overlap the exterior portion as viewed from the front in the front-rear direction when the vehicle is in an upright state.

8. The vehicle according to claim 1, further comprising:

a plurality of left attachments spaced apart from each other in a direction in which the left side member extends; and a plurality of right attachments spaced apart from each other in a direction in which the right side member extends; wherein the left cover is attached to the left side member via the plurality of left attachments; and the right cover is attached to the right side member via the plurality of right attachments.

9. The vehicle according to claim 1, wherein the left side member includes an upper left connector to which a left portion of the upper cross member is turnably connected, and a lower left connector to which a left portion of the lower cross member is turnably connected;

the left cover is attached to the left side member via at least one of the upper left connector and the lower left connector;

the right side member includes an upper right connector to which a right portion of the upper cross member is turnably connected, and a lower right connector to which a right portion of the lower cross member is turnably connected; and the right cover is attached to the right side member via at least one of the upper right connector and the lower right connector.

* * * * *